United States Patent
Le Blanc et al.

(10) Patent No.: US 8,705,597 B2
(45) Date of Patent: Apr. 22, 2014

(54) ESTIMATION OF THE IMPULSE RESPONSE OF A SYSTEM ON THE BASIS OF BINARY OBSERVATIONS

(75) Inventors: Christophe Le Blanc, Grenoble (FR); Eric Colinet, Bois Guillaume (FR); Jerome Juillard, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 187 days.

(21) Appl. No.: 13/003,389

(22) PCT Filed: Jul. 11, 2008

(86) PCT No.: PCT/FR2008/051312
§ 371 (c)(1),
(2), (4) Date: Apr. 22, 2011

(87) PCT Pub. No.: WO2010/004098
PCT Pub. Date: Jan. 14, 2010

(65) Prior Publication Data
US 2011/0274184 A1     Nov. 10, 2011

(51) Int. Cl.
*H04B 3/46* (2006.01)
(52) U.S. Cl.
USPC ........... 375/224; 455/67.11; 370/241; 702/79
(58) Field of Classification Search
USPC ....................................................... 375/224
See application file for complete search history.

(56) References Cited

U.S. PATENT DOCUMENTS

| | | | |
|---|---|---|---|
| 3,718,813 A | 2/1973 | Williams | |
| 4,549,123 A | 10/1985 | Hagglund et al. | |
| 4,754,391 A | 6/1988 | Suzuki | |
| 5,056,109 A * | 10/1991 | Gilhousen et al. | 370/342 |
| 5,283,729 A | 2/1994 | Lloyd | |
| 6,026,130 A * | 2/2000 | Rahmatullah et al. | 375/340 |
| 6,421,401 B1 * | 7/2002 | Palin | 375/343 |

(Continued)

FOREIGN PATENT DOCUMENTS

| | | |
|---|---|---|
| DE | 38 17 078 | 11/1989 |
| EP | 1 003 154 | 5/2000 |
| WO | 96 34323 | 10/1996 |

OTHER PUBLICATIONS

Colinet, E. et al., "Digital Self-Calibration Method for MEMS Sensors", IEEE Transactions on Instrumentation and Measurement, vol. 54, No. 4, pp. 1438-1443, (Aug. 2005).

(Continued)

*Primary Examiner* — Chieh M Fan
*Assistant Examiner* — Santiago Garcia
(74) *Attorney, Agent, or Firm* — Oblon, Spivak, McClelland, Maier & Neustadt, L.L.P.

(57) ABSTRACT

A method of identifying an electronic or electromechanical system includes: applying at least one noise signal (u) as input to the system, applying an output signal of the system to a one-bit analog digital converter, acquiring a signal at the output of the converter, carrying out an estimation of the output of the system with aid of performing an estimation ($\hat{h}$) of the impulse response of the system. The estimation ($\hat{h}$) of the impulse response includes: iterative calculation of a plurality of nh elements ($J_0, \ldots, J_i, \ldots, J_{nh-1}$) of a given criterion (J), each element including, respectively: at least one term of correlation between the signal at the output of the converter and the noise signal.

16 Claims, 20 Drawing Sheets

(56) References Cited

U.S. PATENT DOCUMENTS

| | | | |
|---|---|---|---|
| 6,438,239 B1 * | 8/2002 | Kuchen | 381/71.1 |
| 6,438,431 B1 | 8/2002 | Wang et al. | |
| 6,594,365 B1 | 7/2003 | Eatwell | |
| 6,782,043 B1 * | 8/2004 | Dehghan et al. | 375/224 |
| 7,167,683 B2 * | 1/2007 | Chen | 455/67.11 |
| 7,480,353 B2 * | 1/2009 | Tanabe | 375/340 |
| 7,551,131 B2 * | 6/2009 | Jin | 342/357.62 |
| 7,702,042 B2 * | 4/2010 | Desperben et al. | 375/340 |
| 7,903,717 B2 * | 3/2011 | Takahashi et al. | 375/130 |
| 7,974,350 B2 * | 7/2011 | Yoshida | 375/260 |
| 2010/0250167 A1 | 9/2010 | Colinet et al. | |

OTHER PUBLICATIONS

Colinet, E. et al., "Auto-Calibrage d' un Micro-Accelerometre Par Une Mesure Frequentielle", IN: 3$^{eme}$ Colloque Interdisciplinaire En Instrumentation, vol. 1, pp. 355-362, (2004) (with English abstract).

Colinet, E. et al., "Application of MCLC Method for Estimating the Parameters of MEMS Sensors", IN: Technical Proceedings of the NSTI Nanotechnology Conference and Trade Show Anaheim, vol. 3, pp. 335-337, ISBN 0-9767985-2-2,(2005).

Huertas, G. et al., "Oscillation-Based Test in Bandpass Oversampled A/D Converters", Microelectronics Journal, vol. 34, pp. 927-936, (2003).

Huertas, G. et al., "Oscillation-Based Test in Oversampled ΣΔ Modulators", Microelectronics Journal, vol. 33, pp. 799-806, (2002).

Voda, A. et al. "The Autocalibration of PI Controllers Based on Two Frequency Measurements", International Journal of Adaptive Control and Signal Processing, vol. 9, pp. 395-421, (1995).

International Search Report issued Feb. 10, 2009 in PCT/FR08/051312 Jul. 11, 2008.

Office Action dated Feb. 26, 2013, issued in Japanese Patent Application No. 2011-517189 (English translation).

J. Juillard, Initialization of the BIMBO self-test method using binary inputs and outputs, Proceedings of the 46$^{th}$ IEEE Conference on Decision and Control, United States, IEEE, Dec. 2007, pp. 578-583.

* cited by examiner

ESTIMATION OF THE IMPULSE RESPONSE OF A SYSTEM ON THE BASIS OF BINARY OBSERVATIONS

TECHNICAL FIELD

The invention relates to the identification of systems, in particular for electronic devices such as filters, for example, or electromechanical devices, e.g. in MEMS form.

The invention relates to a device and a method carrying out an estimation of the output of a system by estimating its impulse response in discrete time.

BACKGROUND OF THE INVENTION

In the traditional system identification means, quantification operations can be carried out. These operations are generally modeled by adding white noise b to a signal y that is quantified:

$$y_{quantified} = y + b$$

This noise is all the weaker as the number of bits on which the quantification is done is higher. Thus, to identify a system using a traditional identification method, it is preferable to have an analog digital converter (ADC) with a high resolution.

In that case, with a small number of measurements, it is possible to be freed from the quantification noise.

In the case where an ADC with low precision is used, a significant number of measuring points may be necessary.

One very widespread traditional identification method is the so-called method "of least squares." This method consists of making a parameterized model $\theta_{idéal}$ of the transfer function of the system and minimizing the square deviation between the measured values and estimated values output from the model $\hat{H}_\theta$, the system's input e also being known:

$$\theta_{idéal} = \arg\min(\|\hat{H}_\theta(e) - y_{quantifié}\|^2)$$

In the case where the quantification noise is low enough, the quantified signal $y_{quantifié}$ can be likened to the actual signal y. In that case, if the model $\hat{H}_\theta$ is linear, the parameterized model $\theta_{idéal}$ can be expressed analytically. The input e of the system one wishes to identify is generally white noise.

The method of least squares has the drawback, in particular, of requiring that a high-resolution ADC be integrated.

In another method, called "KLV" (Kessler Landau Voda) (FIG. 1) (block referenced 2), the transfer function H of a system placed in a non-linear feedback loop is identified, including an adjustable hysteresis comparator 3. This comparator makes it possible to cause the system 2 to oscillate. Information can be deduced on the system through the appearance of said oscillations. A one-bit ADC 4 is provided in output of the system. It is then possible to connect, using analytical relationships, the amplitude and the frequency of the oscillations arising in the system to the frequency response value of the system. Each hysteresis value has a corresponding point on the frequency response curve.

Such a method has several drawbacks. First, the validity of the analytical relationships used is based on an approximation called approximation of the first harmonic of the comparator. Moreover, such a method requires a precise measurement of the amplitude and phase of the oscillations, the amplitude measurement requiring a high resolution ADC.

Another method, called "OBT" (Oscillation-Based Test), close to the KLV method, consists of inserting the system one wishes to identify and having a transfer function H, in a non-linear loop including a comparator 6. The return gain (block referenced 7) is adjusted to observe oscillations preferably having as sinusoidal a shape as possible. In this way, it is possible to deduce, using the first harmonic hypothesis, the parameters of the transfer function H using analytical relationships, as for the KLV method.

This method also has the drawback of requiring a precise measurement of the amplitude of the oscillations at the input of the comparator, i.e. a high-resolution ADC 5 (FIG. 2).

An identification method called the "LCM"(Limit Cycle Measurement) method makes it possible to precisely determine the natural frequency and damping of a second order system using two frequency measurements (FIGS. 3A and 3B).

A first measurement is done by placing the system to be identified with transfer function H in a loop including a comparator 9 and a differentiator 8 (FIG. 3A).

A second measurement is done by replacing, in said loop, the differentiator 8 with an integrator 10 (FIG. 3B).

It is thus possible to obtain a relationship between the frequency of the measured oscillations in output from the comparator 6 and the value of the natural frequency and damping of the system to be identified.

This method is based on two digital measurements, the frequency measurement being done by counting the number of switches of the comparator over a given duration. This method has several drawbacks.

It is only applicable to analog integrator or differentiator filters or on samples. Also, in the case of implementation using a digital circuit, it is necessary to have an Analog Digital Converter (ADC) with a good resolution to inject the output of the integrator into the system.

In the "CLCM" (Complex Limit Cycle Measurement) method, the system to be identified 12 is placed in a non-linear feedback loop including a sampled comparator 13 having a sampling period Ts, a digital programmable digital filter 14, and an ADC 15 (FIG. 4).

Depending on the value chosen for the coefficients of the digital filter, binary oscillations or "limit cycles" can be seen in output from the comparator 13. These limit cycles differ from those observed by implementing the KLV method or LCM method in that they have a period that is a multiple of the sampling period Ts. The switching moments of the comparator 13 correspond to sampling moments. Thus, measuring a limit cycle corresponding to a set of coefficients of the programmable filter 14 is completely digital.

This method in particular has the drawback of having to generate long limit cycles to implement it.

The KLV and LCM methods make it possible to establish, at the cost of an approximation, a relationship between the magnitudes measured and parameters one wishes to determine.

The KLV and OBT methods require a high-resolution ADC, while the LCM method requires an ADC with a good resolution. These methods yield insufficient results when the sampling frequency is high.

The CLCM method has a performance that is independent of the sampling frequency, at the cost of heavier processing than that done with the other methods. Moreover, with such a method, good precision requires that long limit cycles be generated, which can be problematic.

The use of the aforementioned closed loop identification methods is particularly problematic when the system to be identified is an electromechanical device in the form of a MEMS. The risk is of not being able to perform the identification at the right operating point, in as much as exciting a MEMS on one of its modes tends to very quickly amplify non-linear phenomena. To offset this, it is possible to add an amplitude gain control (AGC) to the identification system, which may require the use of a high-precision ADC.

The aforementioned identification methods have the drawback of requiring an analog-digital conversion with a significant resolution in output, which makes them more complex to implement and creates cost problems.

The problem arises of finding a new identification method that does not have the aforementioned drawbacks.

BRIEF DESCRIPTION OF THE INVENTION

The present invention first concerns a method of identifying a system comprising the following steps:
- applying at least one noise signal as input to the system,
- applying an output signal $y_k$ of said system to an analogue digital converter, in particular a one-bit analogue digital converter,
- acquiring a signal $s_k$ at the output of said converter,
- carrying out an estimation $\hat{y}_k$ of the output of said system with the aid of means for performing an estimation $\hat{h}$ of the impulse response of said system comprising:
  - the iterative calculation of a plurality of nh elements $J_0, \ldots, J_i, \ldots, J_{nh-1}$ (nh being an integer) of a given criterion J each including: at least one term of correlation between said signal at the output of said converter and said input signal.

The output signal $s_k$ is a binary data signal.

The method according to the invention makes it possible to perform an identification without having to use a high-resolution ADC.

The input signal can be a noise signal.

The system is a device or a group of devices that can be described by a transfer function.

The system can be an electronic device, e.g. a filter, or a sigma-delta converter, or a telecommunications transmission channel, or a DC/DC converter.

According to another possibility, the system can be an electromechanical device, in particular in the form of a MEMS.

The given criterion J is also called "cost function."

The estimation of the impulse response can also comprise: the application to said calculated elements of the given criterion, of a "passage" function f, said passage function f being predetermined as a function of said signal applied at the input of said system, and such that:

$$f(J) = \sum_{i=0}^{nh-1} h_i \hat{h}_i$$

with $h_i$ an impulse response element h of said system and $\hat{h}_i$ an element of said impulse response estimation $\hat{h}$ of said system among a plurality of nh impulse response elements.

The estimation of the impulse response can comprise the application to the calculated elements of the given criterion of a passage function f predetermined as a function of the noise signal applied at the input of the system, so as to obtain a plurality of elements $\hat{h}_0, \ldots, \hat{h}_i, \ldots, \hat{h}_{nh-1}$ of said impulse response estimation $\hat{h}$, said elements of said estimation being such that:

$$(\hat{h}_0, \ldots, \hat{h}_i, \ldots, \hat{h}_{nh-1}) = (f(J_0), \ldots, f(J_i), \ldots, f(J_{nh-1})).$$

According to one possibility, the input signal is a Gaussian noise signal.

In that case, the passage function follows a given relationship determined as a function of this type of noise.

In the case where the input signal is a Gaussian noise signal, said passage function f can follow the relationship: $f(J)=\sigma' \sin((\pi/2)(2J-1))$, with:
$\sigma'^2=\sigma_b^2+\sigma_h^2$ where $\sigma_b$, represents the ambient noise of the system to be identified modeled as an additive Gaussian white noise at the output of the system and $$\sigma_h^2 = \sum_{i=0}^{\infty} h_i^2$$

is the quadratic sum of the different elements of the impulse response.

According to another possibility, the input signal can be a white noise signal.

In that case, the passage function follows a given relationship determined as a function of that type of noise.

In the case where the input signal is a binary white noise signal, said passage function f can follow the relationship:

$$f(J)=\sigma\sqrt{2}((erf^{-1}(1-2J))/\sqrt{1+2(erf^{-1}(1-2J))^2}$$

The estimation $\hat{h}$ of the impulse response can comprise:
- the transmission of the input signal u of the system through a chain of blocks each forming a first order delay function or each having $z^{-1}$ as a z transfer function,
- the acquisition of values $u_k, \ldots, u_{k-i}, u_{k-nh-1}$ of the noise signal at the output of said blocks respectively, said elements $J_0, \ldots, J_i, \ldots, J_{nh-1}$ of said criterion J being calculated with the aid of said values $u_k, \ldots u_{k-i}, u_{k-nh-1}$ of the noise signal at the output of said blocks, respectively.

The signal u is binary in the case of a binary white noise and on several levels in the case of Gaussian noise.

The values $u_k, \ldots, u_{k-i}, u_{k-nh-1}$ of the noise signal u are taken at different moments k, k-1, ..., k-i, k-nh-1.

The calculation of said plurality of nh elements $J_0, \ldots, J_i, \ldots, J_{nh-1}$ of said criterion J can comprise: applying the signal $s_k$ at the output of said converter taken at a given moment k and a noise signal $u_{k-i}$, with (0≤i≤nh) at the output of said system, delayed i times relative to said given moment, to a means forming an exclusive OR logic gate.

Calculating said plurality of nh elements $J_0, \ldots, J_i, \ldots, J_{nh-1}$ of said given criterion J can comprise:
- adding a term dependent on the result jk(n+1) of said application of said exclusive OR function and a term of the cost function calculated at the moment k-1 preceding said given moment.

According to one possible embodiment of the method, the acquisition of the signal $s_k$ at the output of said converter can be done for a given number N of samples, the calculation of the given criterion J being dependent on at least one predetermined coefficient λ, with (λ)~N, with N a given number of samples.

The method can comprise a modification of the value of said coefficient λ during said estimation of said impulse response $\hat{h}$.

Varying the coefficient λ can make it possible to modulate the precision and speed of the estimation.

The estimation $\hat{y}_k$ of the response also comprises: calculating a convolution between the estimated impulse response $\hat{h}$ and the noise input signal u.

A comparison of the output signal sk, and the estimation ŝk of that output signal can be done over a given period to determine whether the estimation done is correct.

The modification of said coefficient λ can be done as a function of the evaluation of a second criterion Jt whereof the calculation is similar to that of the cost function J and that makes the comparison between $s_k$ and $\hat{s}_k$.

Thus, the modification of said coefficient λ can be done as a function of the evaluation of a second criterion Jt, the evaluation of said second criterion Jt(n+1) at a given moment n+1 being done by iterative calculation including at least one exclusive OR logic operation term XOR between said output signal $s_k$ of said converter and an estimation $\hat{s}_k$ of that signal, and a term depending on said second criterion Jt(n) calculated at a moment n preceding the given moment.

The modification of the coefficient λ can be done as a function of the evaluation of said second criterion Jt and the result of the application of a predetermined second function ft to said second criterion Jt.

The second function ft can be an affine function, such that:

$$ft(Jt)=\lambda=\alpha*Jt+\beta$$

(with α>0 and β>0) The coefficients α and β can for example be chosen such that:
  λ tends towards N when it tends towards 0
  λ tends towards $2^6$ when it tends towards 1

The precision of the identification depends very little on the frequency of the sampling and has a good robustness to the measuring noise.

At a given identification precision, the method according to the invention requires fewer measuring points than the identification methods according to the prior art.

The method according to the invention is not based on an approximation, whether a "white noise" or "first harmonic" approximation, but rather on minimizing a criterion that, without approximation, depends on the one-bit quantification operation done by the analog-digital converter.

In the case where the system to be identified is a MEMS or an integrated electronic circuit, the identification method has the following advantages relative to the methods according to the prior art:
  it can be implemented using a sampled one-bit ADC, which allows savings in terms of space and cost relative to methods requiring the use of a high-resolution ADC,
  it can operate in an open loop and does not disturb the system's operating point,
  the measurements are done close to the system to be identified, a one-bit analog digital converter requiring few resources and little surface area to be implemented, which minimizes the measuring noise.

The invention also relates to a method of identifying an electronic or electromechanical system, provided to carry out an identification method as defined above.

The invention also relates to a device for identifying an electronic or electromechanical system, comprising:
  a means for generating a noise signal u, intended to generate a noise signal at the input of said system,
  a one-bit analog digital converter, to which an output signal $y_k$ of the system is intended to be applied,
  a means for carrying out an estimation $\hat{y}_k$ at the output of the system, using an estimation $\hat{h}$ of the impulse response of said system comprising:
  a first calculation means: to perform an iterative calculation of a plurality of nh elements (with nh being an integer) $J_0, \ldots, J_i, \ldots, J_{nh-1}$ of a given criterion J including at least one correlation term between said signal output from said converter and said noise signal.

An analog digital converter can be provided to generate an analog excitation signal of the system.

The means for carrying out said estimation $\hat{y}_k$ at the output of the system can also comprise: a second calculation means, provided to apply, to the calculated elements $J_0, \ldots, J_i, \ldots,$ $J_{nh-1}$ of said given criterion J, a passage function f predetermined as a function of the noise signal $u_k$ transmitted at the input of said system, and such that:

$$f(J) = \sum_{i=0}^{nh-1} h_i \hat{h}_i$$

with hi an impulse response element h of said system and $\hat{h}i$ an element of said impulse response estimation $\hat{h}$ of said system.

The second calculation means can comprise one LUT or several LUTs.

The passage function f can be applied using a LUT, connected at the input, to a multiplexer means, and at the output, to a demultiplexer means.

According to one possible embodiment, the noise signal uk can be a white noise signal.

The means for generating said noise signal uk can comprise a LFSR random sequence generator.

In the case where the input signal uk from the system is a white noise signal, said passage function f can follow the relationship:

$$f(J)=\sigma\sqrt{2}((erf\text{-}1(1-2J))/\sqrt{1+2(erf^{-1}(1-2J))^2}$$

The impulse response estimation means can comprise: a chain of blocks respectively forming a first order delay function or having $z^{-1}$ as z transfer function, said chain being intended to receive said input signal $u_k$, and to transmit values $u_k, \ldots u_{k-i}, u_{k-nh-1}$ the delayed noise signal at the output of said blocks, respectively.

The first calculation means can comprise a means forming an exclusive OR logic gate, to perform an exclusive OR logic operation between said output signal sk of said comparator taken at a moment k and said noise signal (uk−I, with 0≤i≤nh) delayed by i relative to said given moment.

The first calculation means can comprise an adding means, to add the result of said logic operation to a term depending on an element of said given criterion calculated previously.

The acquisition of the signal $s_k$ at the output of said converter can be done for a given number N of samples, the calculation of the given criterion J by the first calculation means being dependent on at least one predetermined coefficient λ, 1+λ being equal to said given number N.

The device can also comprise: a means for modifying the coefficient value λ during said estimation $\hat{h}$ of said impulse response.

The first calculating means can comprise a means making it possible to apply said coefficient λ in the form of at least one shift register and/or means for applying a ratio 1/(1+λ) in the form of at least one shift register.

According to another possibility, the first calculating means can comprise a means making it possible to apply a ratio (1/λ) in the form of at least one shift register.

The modification of the coefficient λ can be done as a function of the evaluation of a second criterion Jt. The calculating structure for the second criterion can be similar to that making it possible to calculate the given criterion J.

The identification device can also comprise:
  a means for evaluating said second criterion it including at least one exclusive OR logic gate to perform an exclusive OR logic operation between said output signal $s_k$ from said converter and an estimation $\hat{s}_k$ of that signal,
  an adding means, for adding the result of said logic operation between said output signal $s_k$ from said converter and an estimation $\hat{s}_k$ of that signal, to a term depending on an element of said second criterion previously calculated.

The coefficient λ can be modified as a function of the evaluation of said second criterion Jt, for example using the following relationship:

$$\lambda = \alpha * Jt + \beta \text{ (with } \alpha > 0 \text{ and } \beta > 0)$$

With λ that tends towards N when Jt tends towards 0
λ that for example tends towards $2^6$ when it tends towards 1

The means for performing said estimation $\hat{y}_k$ can comprise a means for convolution calculation, provided to calculate a convolution between the estimated impulse response $\hat{h}$ and the noise input signal.

BRIEF DESCRIPTION OF THE DRAWINGS

The present invention will be better understood upon reading the description of embodiments, provided purely for information and non-limitingly, in reference to the appended drawings in which.

The different parts illustrated in the figures are not necessarily shown according to a uniform scale, to make the figures more legible.

DETAILED DESCRIPTION OF SPECIFIC EMBODIMENTS

An example of a method according to the invention for identifying a system and a device for carrying out such a method will now be given.

Such a method uses a processing called "BIMBO_inline" ("Basic Identification Method Using Binary Observations," "inline" meaning that the method uses identification with the aid of binary signals called observations and is done in real time) and can be implemented for example using at least one digital signal processor (DSP), and/or at least one microprocessor and/or at least one FPGA circuit and/or at least one computer.

Figure 1:
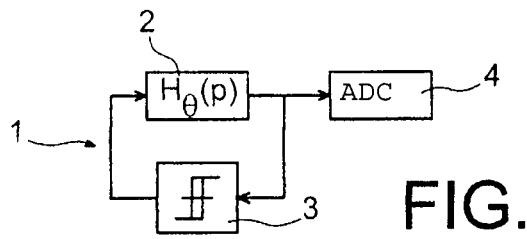
FIG. 1 provides an example of a device for carrying out a method of identifying a system according to the prior art, called KLV method.
Figure 2:
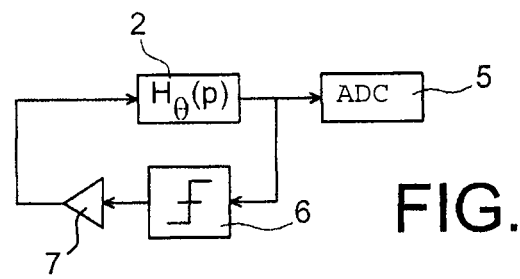
FIG. 2 shows an example of a device for carrying out a method for identifying a system of the prior art, called OBT method.
Figure 3A:
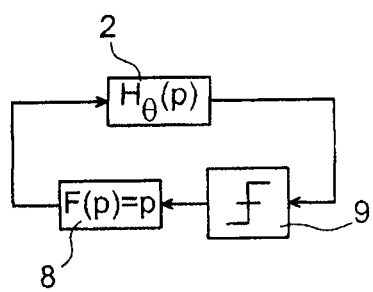
FIGS. 3A-3B illustrate another example of a method of identifying a system according to the prior art, called LCM method.
Figure 3B:
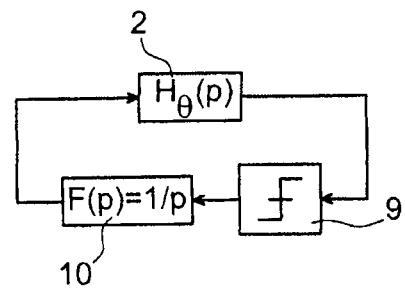
Figure 4:
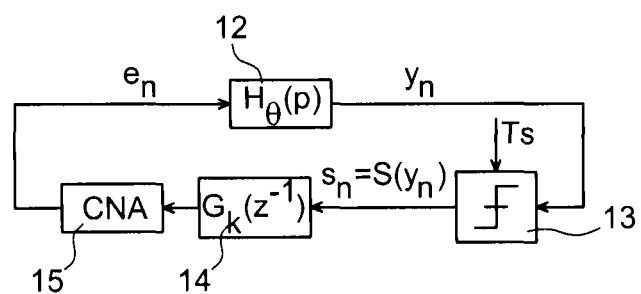
FIG. 4 illustrates another example of a method of identifying a system according to the prior art, called CLCM method.
Figure 5:
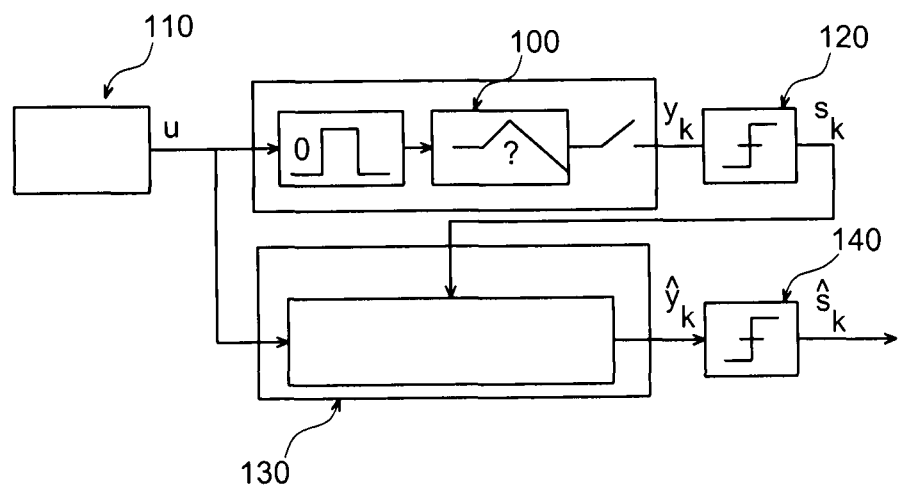
FIG. 5 illustrates an example of a device for carrying out a method for identifying a system according to the invention.

In FIG. 5, a block diagram equivalent to a device implementing such a method is provided.

The identification comprises an estimation of the system's output, using an estimation of the impulse response of that system.

The system to be identified is a system capable of being described by a transfer function.

The system to be identified can for example be an electronic device such as a filter, a sigma delta converter, a DC/DC converter, or a telecommunications transmission channel.

The system to be identified can for example be an electromechanical device, for example in the form of a MEMS.

First, a signal u is generated at the input of the system 100.

The signal u is preferably a discrete signal $u_k$ with k representing a moment in discrete time. The signal $u_k$ can be a spectrally rich signal such as a noise signal, in particular a Gaussian noise or a white noise.

In the case where the signal u is a Gaussian white noise, a digital analog converter can be used to generate the excitation of the observed system, the sign of the noise being exploited in the identification method.

In the case of a binary white noise, a zero order hold can be used to excite the observed system 100 and as input signal for the present structure.

The input signal $u_k$ can be produced by a noise generator 110. A noise generator similar to those used in cryptography and which implements a LFSR (Linear Feedback Shift Register") with a shift register can be used, for example. With such a generator, certain bits of a sequence undergo operations or transformation before being reinserted in a loop. Such a generator is provided to produce pseudo-random sequences. The generator can for example be of the $32^{nd}$ order LFSR type corresponding to the following primitive polynomial:

$$1+x+x^3+x^{30}.$$

Figure 6:
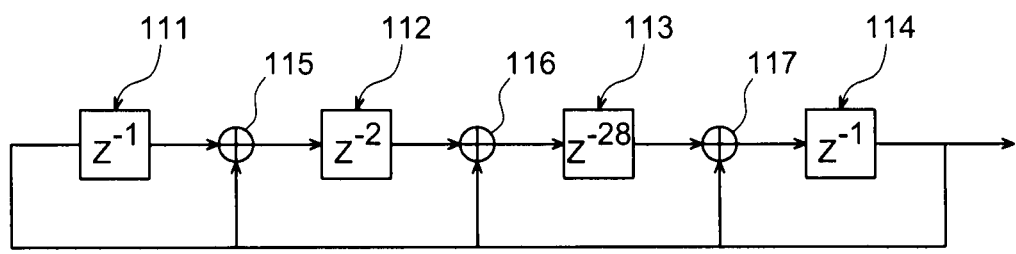
FIG. 6 illustrates an example of a LSFR noise generator integrated in a device according to the invention.

One example of a LFSR generator is given in FIG. 6. This generator is formed by a series of blocks 111, 112, 113, 114 having z transfer functions equal to $z^{-1}$, $z^{-2}$, $z^{-28}$, $z^{-1}$, respectively. The generator also comprises a first summer 115, between the first block 111 and the second block 112, a second summer 116 between the second block 112 and the third block 113, a third summer 117 between the third block 113 and the fourth block 114 being reinjected at the input of each of the summers 115, 116, 117.

The method comprises several steps for acquiring input and output signals of the system 100 to be characterized or identified.

The response signal $y_k$ is then injected in means forming a comparator 120 at the output of which a sampled discrete output signal $s_k$ is transmitted. The comparator 120 can be a one-bit ADC. This comparator 120 can be provided to apply a signum S( ). Such a signum S( ) makes it possible to perform the following processing:

$o=sign(x)$ and $x \rangle 0$ then $o=0$ $o=sign(x)$ and $x \langle 0$ then $o=1$ if:

The aim is to produce an estimation $\hat{y}_k$ of the output of the system 100, with the aid of a means 130 in the form of a processing block or a processing module intended to carry out the BIMBO_inline method.

The means 130 can form an approximate parametric model of the unknown system 100. The method makes it possible to make the approximate model converge as closely as possible with the observed actual system 100.

Estimation calculations $\hat{h}$ of the impulse response of the actual system are done by the means 130, the estimated impulse response having to correspond to that of the observed system, when the parametric model converges towards the actual system. The means 130 can for example be implemented with the aid of a FPGA. According to other possibilities, the means 130 can be implemented with the aid of a digital signal processor (DSP), and/or a microprocessor, and/or a computer.

The calculations of the estimation $\hat{h}$ are done from the input signal u and the output sign s of the comparator 120, these signals u and s being injected at the input of the means 130. These signals s and u are also called "observations." In the present case, the observations are in the form of binary signals.

The means 130 thus produces, as output, an estimation $\hat{y}_k$ of the output of the system 100, which is injected into a second comparator 140, for example in the form of a second one-bit ADC, to apply the signum to that estimation. The signal $\hat{S}_k=S(\hat{y}_k)$, with S( ) being the signum, can then be compared to the signal $s_k$ coming from the first comparator 120.

It may be considered that the estimation of $\hat{y}_k$ done is satisfactory when s and $\hat{s}$ are equal over a significant duration. "Significant" duration here refers to a period at least 1000 times the sampling period, for example corresponding to a number N of observation samples in the vicinity of 8000 or 10000.

The method according to the invention makes it possible to obtain an estimation $\hat{y}$ of the output of the system 100 observed with the aid of an estimation $\hat{h}$ of its impulse response.

Throughout this description, "impulse response of a system" will refer to the temporal output of that system when it is stimulated by an impulse. In the case of a discrete signal, the impulse response may be considered like the system's response to a Dirac type impulse. The estimation of the system's impulse response 100 can be defined by a set of discrete elements $\hat{h}_i$.

Figure 7:
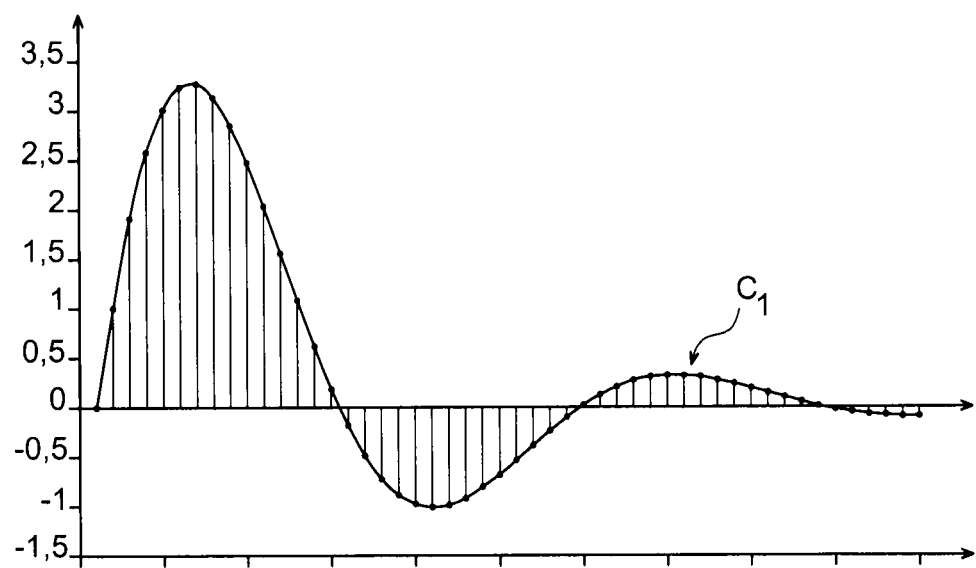
FIG. 7 provides an example of a curve representative of an impulse response of an IIR filter.

In FIG. 7, an example of a curve $C_1$ representative of an impulse response of a discrete IIR filter is given. In this figure, a number nh of elements of the impulse response is such that nh=50. The set of nh elements of an impulse response can be described via a set of points $(h_0, h_1, h_2, \ldots, H_{nh-1})$.

The processing done by the means aims to obtain the following relationship:

$$(h_0, h_1, h_2, \ldots, h_{nh}) = (\hat{h}_0, \hat{h}_1, \hat{h}_2, \ldots, \hat{h}_{nh})$$

With $h_i$ being an element of an impulse response and $\hat{h}_i$ being an element of an estimated impulse response.

An error between the signal y and the estimation $\hat{y}$ of that signal is called a prediction error. At a moment n, the prediction error E can be defined as follows:

$$\epsilon(n)=y(n)-\hat{y}(n)$$

Through successive iterations, the model implemented by the means 130 can be adjusted so as to correct the estimation $\hat{y}_k$ produced and thereby maximize the similarities between the signal $S_k$ and its estimation $S_k=S(\hat{y}_k)$.

This adjustment is done in particular using a calculation of a given criterion J done by the means 130. This criterion J, which will also be called "cost function," depends on a set of observation acquired up to a moment n, with:

$$J(n)=g(y(0) \ldots y(n), \hat{y}(0) \ldots \hat{y}(n), n)$$

In the present case, the output s( ) of the comparator 120 is exploited in order to perform the calculation of said cost function. The cost function can therefore also be written:

$$J(n)=g(s(0) \ldots s(n), \hat{s}(0) \ldots \hat{s}(n), n)$$

To make it possible to evaluate an impulse response, a cost function meeting the following general formula can be implemented:

$$J = \frac{1}{4N}\sum_N (s_k - \hat{s}_k)^2$$

The criterion J has a value between 0 and 1 and is minimal in the zone of the parameter space of the parametric model that will be called the "acceptability zone" of the approximate parametric model.

Two different examples of calculations of the cost function J, including a comparison term between the output signal s and the estimated output signal ŝ, will now be given.

According to a first possibility, one can have $S(y_k) \in [-1;1]$ with S( ) being the signum. In that case, when:

$$y_k > 0 => S(y_k) = 1$$

$$y_k < 0 => S(y_k) = -1$$

The signals s and $\hat{s}_k$ being coded on one bit.

We therefore have the following relationship:

$$J = \frac{1}{4N}\sum_N (s_k - \hat{s}_k)^2 = \frac{1}{2} - \frac{1}{2N}\sum_N s_k \hat{s}_k$$

In this case we note:

$$Csu = \frac{1}{N}\sum_N s_k \hat{s}_k$$

With:

$$J = \frac{1}{2} - \frac{1}{2}Csu$$

Figure 8A:
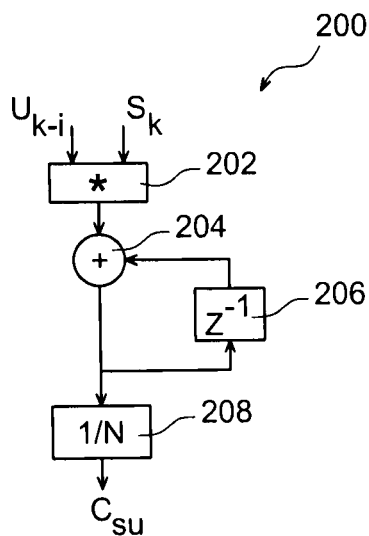
FIGS. 8a-8B provide examples of cost function calculation units integrated into a device according to the invention and in particular a structure for estimating the output of a system to be identified with the aid of an estimation of the impulse response of that system.

A first example of a unit 200 (FIG. 8A) integrated in the means 130 can be provided to carry out the iterative calculation of a cost function element Ji according to this first possibility. The means 130 with a unitary impulse response model, such that the calculation of Ji includes a correlation term between the signal $s_k$ at the output of said converter and the noise signal:

$$J_i = \frac{1}{2} - \frac{1}{2N}\sum_N s(k)u(k-i)$$

With Ji an element of the cost function, and N a number of calculation points or observations, of the processing done. This result $J_i$ will then be used to determine an $i^{th}$ element $\hat{h}_i$ of the estimation of the impulse response of the observed system. The result Ji, which is a cost function element, corresponds to a correlation coefficient or a correlation term between the output signal s and the input signal u of the system 100. The cost function element $J_i$ is determined by an iterative calculation including a correlation term between the signal s and the signal u.

In this example, the cost function calculation element $J_i$ unit 200 comprises a means 202 forming a multiplier at the input of which an output signal $s_k$ taken at a moment k and an input signal $u_{k-i}$ delayed from i are transmitted.

The unit 200 also comprises a means 204 forming a summer at the output of the multiplier 202, as well as a means 206 forming a first order discrete delay filter, or a z transfer function block equal to $z^{-1}$ at the output of the summer.

The output of the block 206 is reinjected at the input of the summer 204, while a means 208 forming a divider by N (with N being the number of samples or iterative calculation points on which the calculation is done) at the output of the summer 204. A relooping is thus formed such that an element Ji(n+1) calculated at a given moment depends on an elements Ji(n) previously calculated.

At the output of the means 208, a correlation Csu is obtained between sk and ŝk:

$$Csu = \frac{1}{N}\sum_N s_k \hat{s}_k$$

According to a second calculation possibility of the cost function, one can have $S(y_k) \in [0;1]$ In this case, when:

$$y_k > 0 => S(y_k) = 0$$

$$y_k < 0 => S(y_k) = 1$$

But the signals s and ŝ can be coded in binary and are capable of adopting a '0' state or a '1' state.

The following calculation can be done:

$$J = \frac{1}{N}\sum_N (s_k - \hat{s}_k)^2 = \frac{1}{N}\sum_N xor(s_k, \hat{s}_k)$$

Figure 8B:
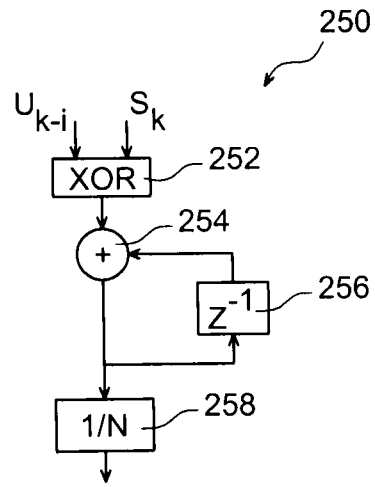

A second example of a unit 250 for calculating an element Ji of the cost function J according to said second possibility is provided in FIG. 8B. This unit 250 can be provided to perform the following calculation:

$$J_i = \frac{1}{N}\sum_N XOR(s_k, u_{k-1})$$

With Ji being an element of the cost function, and N a number of samples. The cost function element $J_i$ is thus determined through an iterative calculation including a correlation term between the signal s and the noise signal u.

The unit 250 comprises a means 252 forming an exclusive OR logic gate (XOR) at the input of which the output signal $s_k$ of the comparator 120 at a moment k and the input signal $u_{k-i}$ of the system 100 delayed by i are transmitted.

A means 254 forming a summer is provided at the output of the XOR gate, while a means 256 forming a first order delay filter or a z transfer function block equal to $z^{-1}$ is placed at the output of the summer 254, the output of the block 254 being reinjected at the input of the summer 254. The cost function element $J_i$ thus depends on a cost function element calculated at a preceding moment. A means 258 intended to perform a division by N (with N being a number of samples) is also provided at the output of the unit 250 and delivers the result $J_i$ corresponding to a correlation coefficient between the signal s and the signal u delayed by i sampling periods. This result $J_i$ is then used to estimate the $i^{th}$ element $\hat{h}_i$ of the impulse response of the observed system.

δ is defined as a term to term product of elements of the impulse response ($h_0, \ldots, h_i, \ldots, h_{nh-1}$) of the observed system and estimations ($\hat{h}_0, \ldots, \hat{h}_i, \ldots, \hat{h}_{nh}$) of impulse response elements.

A "passage" function f connecting the cost function J to δ, with $$\delta = f(J) = \sum_{i=0}^{nh-1} h_i \hat{h}_i$$

(hi being an impulse response element of the system and ĥi an impulse response estimation element of the system) is also implemented and used by the means 130.

The passage function f is a function chosen so as to make it possible to go from the calculation of an element $J_i$ of the cost function to a value of an element ĥi of the estimation of the impulse response, such that $f(J_i)=\hat{h}_i$. The passage function f is determined as a function of the input signal injected into the system 100.

Figure 9:
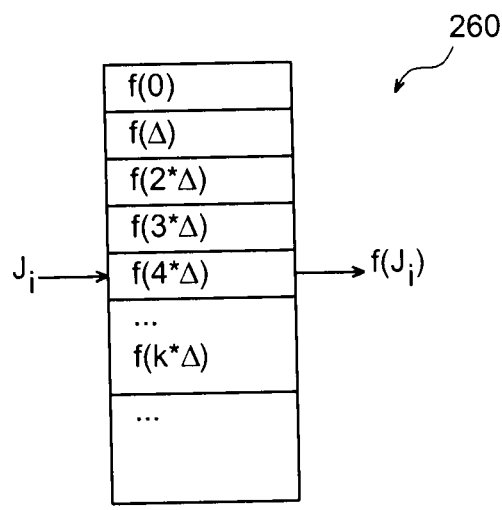
FIG. 9 provides an example of LUT in a device according to the invention, for applying a passage function between a cost function and an estimated impulse response estimation element.

The passage function f can be carried out using at least one storage unit called LUT (Look Up Table) and which makes an impulse response estimation element ĥi value correspond to a cost function J element Ji value. An example of a LUT 260 is given in FIG. 9. The LUT 260 is characterized in particular by its size and by a pitch Δ. The impulse response data is stored with a pitch Δ in the LUT, such that only certain image values of the passage function are accessible: values f(0), f(Δ), f(2*Δ), . . . . The LUT 260 thus yields output values each corresponding to a range of cost function J values.

According to one example, in the case where the input signal u is a Gaussian noise, the passage function f from a cost function to an impulse response element can satisfy the following law:

$$f = \sigma' \sin\left(\frac{\pi}{2}(2 \cdot J - 1)\right)$$

With J being the cost function and $\sigma'^2 = \sigma_b^2 + \sigma_h^2$ a where $\sigma_b$, represents the ambient noise of the system to be identified modeled as an additive Gaussian white noise at the output of the system and $$\sigma_h^2 = \sum_{i=0}^{\infty} h_i^2$$

the quadratic sum of the different elements of the impulse response.

By default one can choose σ'=1. It is then possible to identify the impulse response of the system to the closest gain.

Figure 10A:
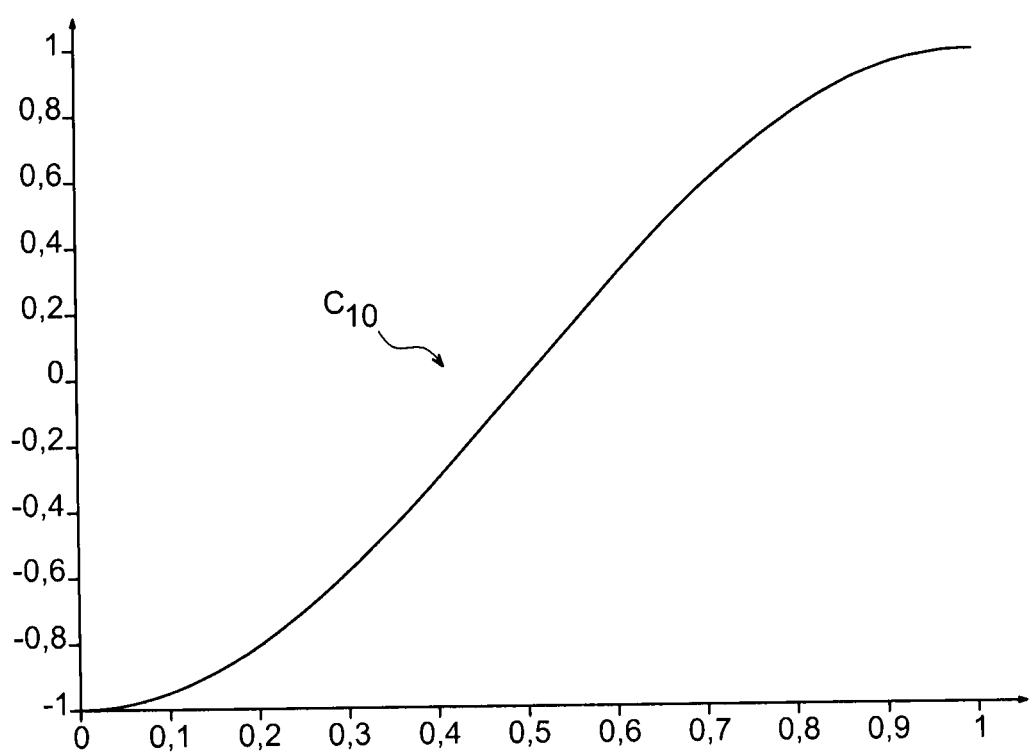
FIGS. 10A-10B provide examples of curves representative of predetermined passage functions in the cases of an input signal in the form of a Gaussian noise injected into the system to be identified, and in the case of an input signal in the form of a white noise, respectively.

In FIG. 10A, an example of a curve $C_{10}$ representative of a passage function f between the criterion J and the impulse response is given in a case where the input signal u of the system 100 to be identified is transmitted in the form of a Gaussian noise.

According to another example, in the case where the input signal u is a white noise, the passage function f from the cost function to the impulse response can satisfy the following law:

$$f(Csu) = \sigma\sqrt{2}\,\frac{\mathrm{erf}^{-1}(Csu)}{\sqrt{1 + 2(\mathrm{erf}^{-1}(Csu))^2}} = \sum_{i=0}^{nh-1} h_i \hat{h}_i$$

$$J = \frac{1}{4N}\sum_N (s_k - \hat{s}_k)^2 \text{ and } J = \frac{1}{2} - \frac{1}{2}Csu$$

$$Csu = \frac{1}{N}\sum_N s_k \hat{s}_k$$

We thus have:

$$f(J) = \sigma\sqrt{2}\,\frac{\mathrm{erf}^{-1}(1-2J)}{\sqrt{1 + 2(\mathrm{erf}^{-1}(1-2J))^2}}$$

By default, σ can be chosen equal to 1.

Figure 10B:
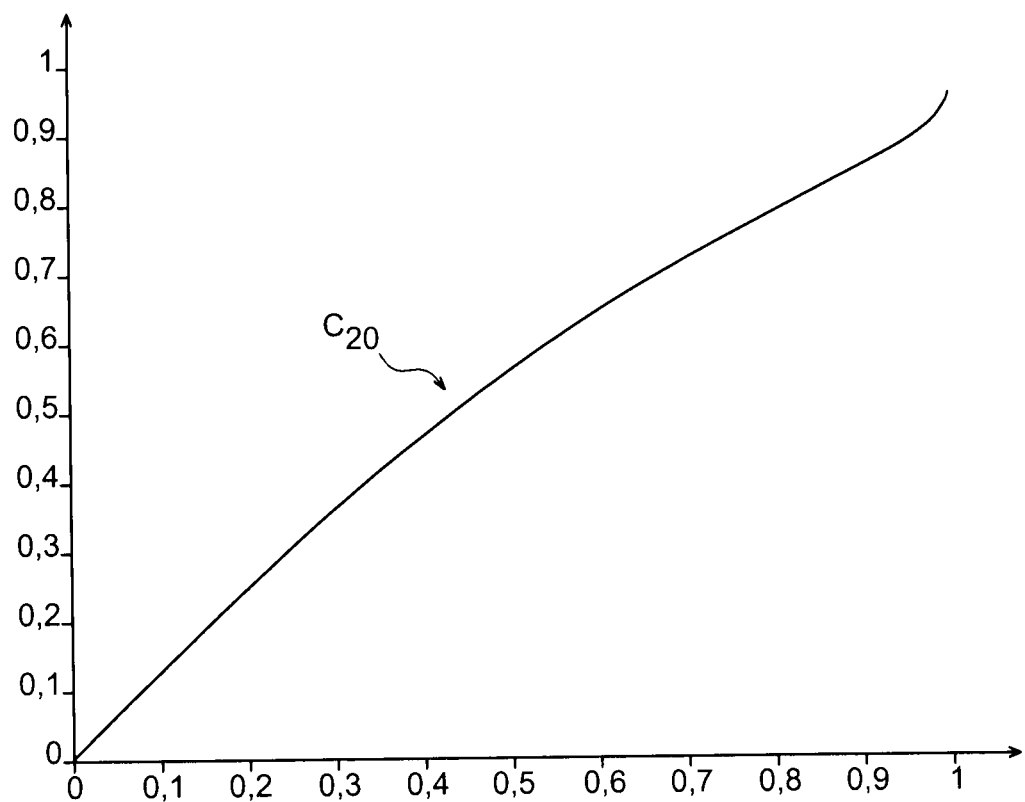

In FIG. 10B, another example of a curve $C_{20}$ representative of a passage function f between the criterion J and the impulse response is given in the case where the input signal of the system 100 to be identified is a white noise.

Figure 11:
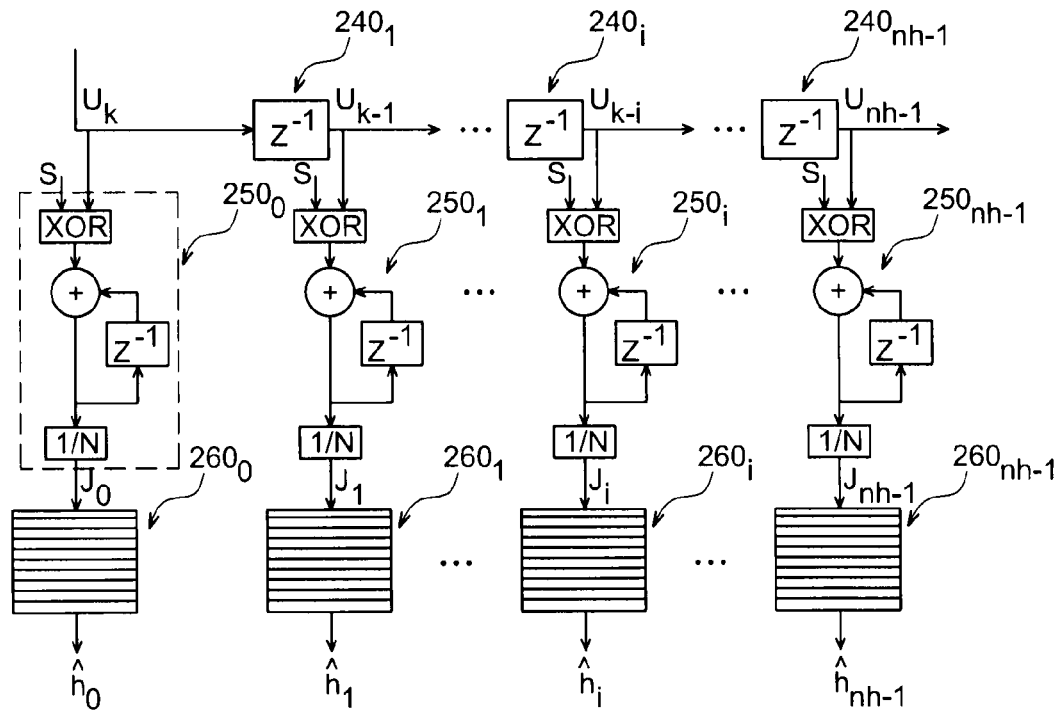
FIG. 11 provides an example of a structure for calculating an impulse response estimation within a device according to the invention.

In FIG. 11, an example of a module integrated with the means 130 and provided with nh levels to perform a calculation of nh (nh being an integer greater than 1) elements of an estimation ĥ of the impulse response of the system 100 is given.

This module first includes a plurality of nh−1 blocks forming a chain of first order discrete delay filters: 240₁, . . . , 240$_i$, . . . , 240$_{nh−1}$ each having a z transfer function equal to: $z^{-1}$.

At the input of the series of delay filters, the input signal $u_k$ of the system 100 at a moment k is transmitted, delayed signals $u_{k-1}, \ldots, u_{k-i}, \ldots, u_{nh-1}$, are obtained at the output of the filters 240₁, . . . , 240$_i$, . . . , 240$_{nh−1}$, respectively.

A plurality of nh calculation units 250₀, . . . , 250$_i$, . . . , 250$_{nh−1}$ of elements $J_0, \ldots, J_i, \ldots, J_{nh-1}$ of the cost function J similar to the unit 250 described above relative to FIG. 9B are also provided.

The cost function element calculation units 250₀, . . . , 250$_i$, . . . , 250$_{nh−1}$ each receive, as input, the output signal $s_k$ from the comparator 120 at a moment k and the signals $u_k, \ldots, u_{k-1}, u_{k-i}, \ldots, u_{nh-1}$, respectively, corresponding to delayed input signal values of the system 100.

The structure also includes a plurality of nh means 260₀, 260₁, . . . , 260$_i$, . . . , 260$_{nh−1}$ for applying the passage function f( ). The passage function can be that for which the law was provided above, in the case where the input u is a white noise signal. The means 260₀, 260₁, . . . , 260$_i$, . . . , 260$_{nh−1}$ can assume the form of nh LUTs of the type described relative to FIG. 10, and receive, as input, cost function elements $J_0$, $J_1, \ldots, J_i, \ldots, J_{nh-1}$, respectively, and delivering, as output, impulse response estimation elements $\hat{h}_0, \hat{h}_1, \ldots, \hat{h}_i, \ldots, \hat{h}_{nh-1}$.

From the impulse response estimation, it is possible to obtain an estimation ŷ of the output of the system 100. To that end, the following calculation is done by the means 130:

$$\hat{y}(n) = \sum_{k=1}^{n} u(k)\hat{h}(n-k)$$

A convolution operation between the estimation ĥ of the impulse response and the binary input u of the observed system 100 is done.

Figure 12:
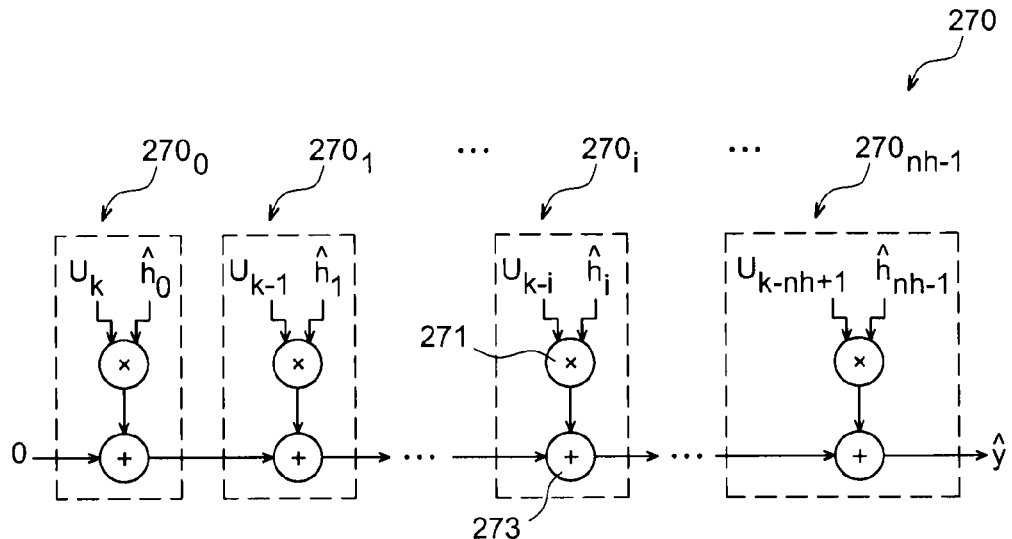
FIG. 12 provides an example of a convolution calculation structure between impulse response and an input signal of a system to be identified, integrated into an identification device according to the invention.

In FIG. 12, an example of a module 270 integrated with the means 130 and making it possible to perform said convolution operation is given. This module includes a plurality of nh levels $270_0$, $270_1$, ..., $270_i$, ..., $270_{nh-1}$, respectively receiving, as input, input signals $u_k$, $u_{k-1}$, ..., $u_{k-i}$, ..., $u_{k-nh+1}$ of the system at different moments k, k-1, ..., k-i, ..., k-nh+1, and impulse response estimation elements $\hat{h}_0$, $\hat{h}_i$, ..., $\hat{h}_i$, ..., $\hat{h}_{nh-1}$.

Each level of the module 270 includes multiplying means 271 of the two inputs of the level as well as a means 273 for adding the output of the multiplying means 271 to an output from a preceding level, in other words, to add the result of said multiplication to the result of a preceding level. The module 270 for performing the convolution operation delivers, as output, the estimation ŷ of the output y of the system 100.

Figure 13:
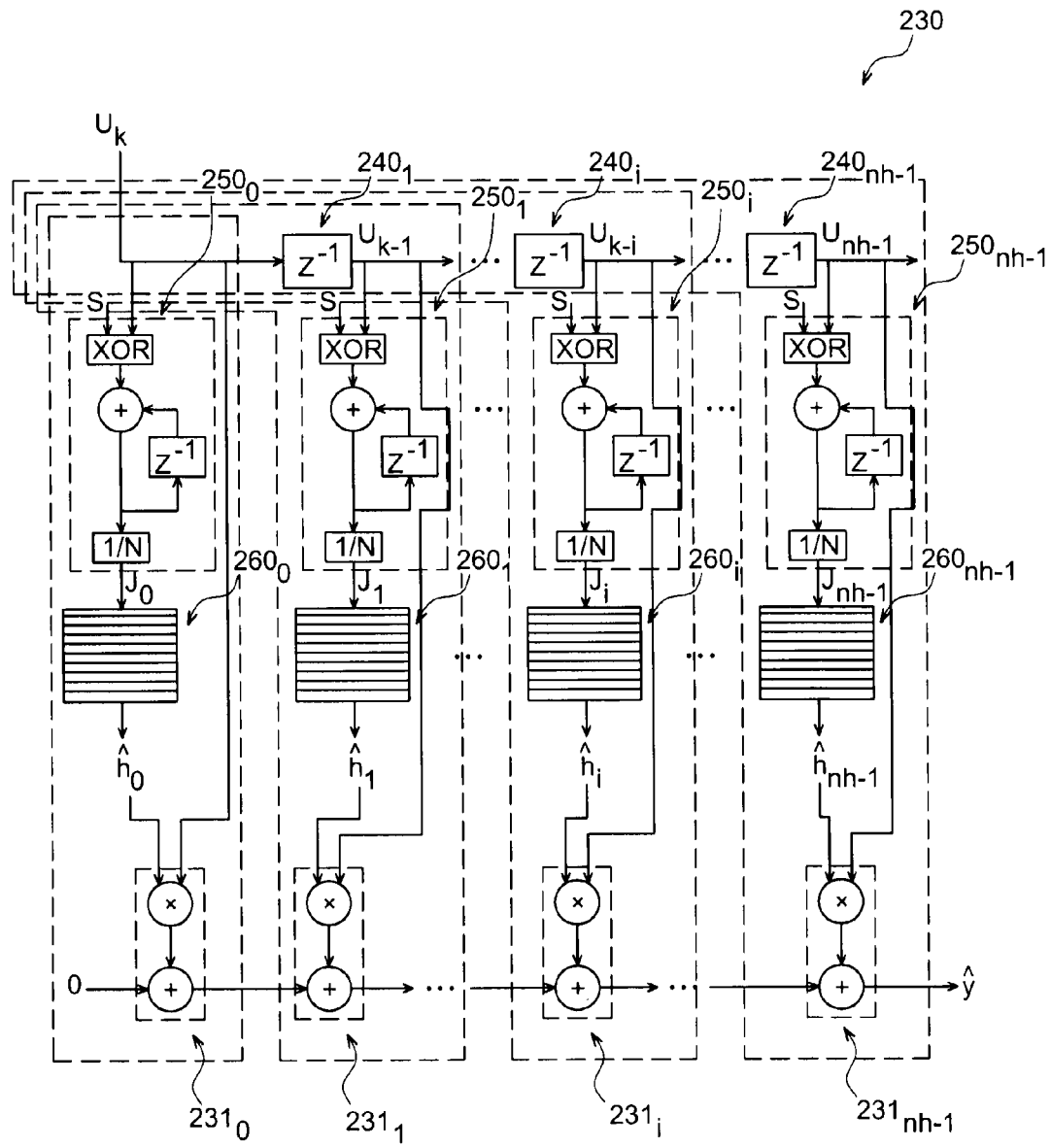
FIG. 13 illustrates an example of an impulse response estimation structure and output of a system, within a device according to the invention.

In FIG. 13, an example of a complete structure for delivering an estimation ŷ is shown.

This structure 230 includes nh levels $231_0$, $231_1$, ..., $231_i$, ..., $231_{nh-1}$, the number of levels nh being able to be provided in particular as a function of the complexity of the system 100 to be identified. The non-zero elements of the impulse response of the system are estimated. If the number of non-zero elements of the impulse response is noted $n_0$, $n_0$ and nh are such that nh>$n_0$.

This structure 230 includes a zero order filter or a z transfer function block: $z^{-0}$, as well as a plurality of nh-1 blocks $240_1$, ..., $240_{nh-1}$, having as z transfer function: $z^{-1}$ or respectively forming a first order delay filter, these blocks being arranged in a series or in a chain of blocks.

The structure 230 also includes nh units $250_0$, ..., $250_{nh-1}$ for cost function evaluating elements $J_0$, ..., $J_{nh-1}$, units $260_0$, ..., $260_{nh-1}$ LUTs to apply the passage function f and obtain impulse response estimation elements $\hat{h}_0$, ..., $\hat{h}_{nh-1}$, as well as nh units $270_0$, ..., $270_i$, ..., $270_{nh-1}$ to perform the convolution operation and produce the estimation ŷ.

Figure 14:
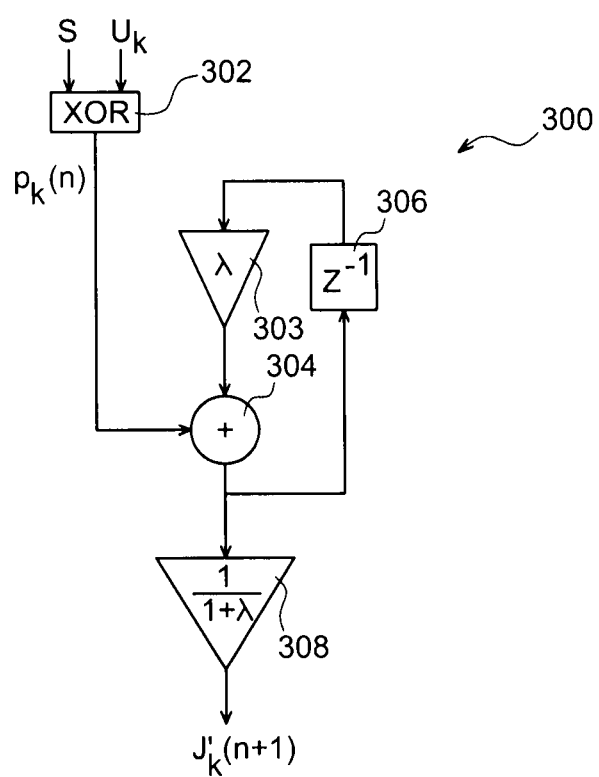
FIG. 14 provides an alternative of a cost function calculation unit integrated in a device according to the invention, and in particular a structure for estimating the output of a system to be identified using an estimation of the impulse response of that system.

In FIG. 14, another example of a cost function element calculation unit 300 making it possible to perform the calculation of an element of a cost function variation J', different from the cost function J previously described, is given. The cost function element is determined by an iterative calculation including a correlation term between the output signal of the system and the input signal of the system.

The unit 300 comprises a means 302 forming an exclusive OR logic gate (XOR) at the input of which an output $s_k$ of the comparator taken at a moment k is transmitted, and an inlet $u_{k-i}$ of the system delayed by i samples.

The unit 300 comprises a means 304 forming a summer at the output of the XOR gate, a means 306 forming a first order delay filter at the output of the summer 304 and the output of which is reinjected as input of the means 303 to apply a coefficient λ, the output of the means 303 to apply the coefficient λ being transmitted as input of the summer 304. The output of the summer is transmitted at the input of a means 308 for performing a division by (1+λ). At the output of the means 308, an element of said second cost function J' is obtained.

The sum (1+λ) corresponds to a number N of samples or calculation points or observations.

In this example, the coefficient λ is also chosen such that (1+λ) is equal to a power of 2, such that the means 308 for applying the coefficient 1/(1+λ) is a means for performing a shift of bits from their binary input. The means 308 can for example take the form of a shift register. Relative to a unit like those (reference 200 and 250) described relative to FIGS. 8A and 8B, this makes it possible to do away with a divider and simplify performance of the calculation.

The coefficient λ is also chosen such that λ is large before one (1<<λ). λ "large" before 1 means that λ is greater than $2^{10}$.

The coefficient λ can be configurable, possibly configurable during the identification method.

The cost function variation J' implemented by the unit 300 can use the following relationship:

$$J'_k(n+1) = (1 * j_k(n) + \lambda * J'_k(n))/(1+\lambda)$$

with $j_k(n)$ being the output of the means 302 forming a XOR logic gate, λ the coefficient whereof the sum with the unit corresponds to a number N of calculation points or samples.

$$J'(n+1) = \frac{j(n) + \lambda j(n-1) + \lambda^2 j(n-2) + \ldots + \lambda^{N-1} j(n-N+1)}{1+\lambda}$$

When λ is chosen such that 1<<λ, we have J'(n)≈J(n), the cost function J being substantially equal to the cost function variation J'.

Figure 15:
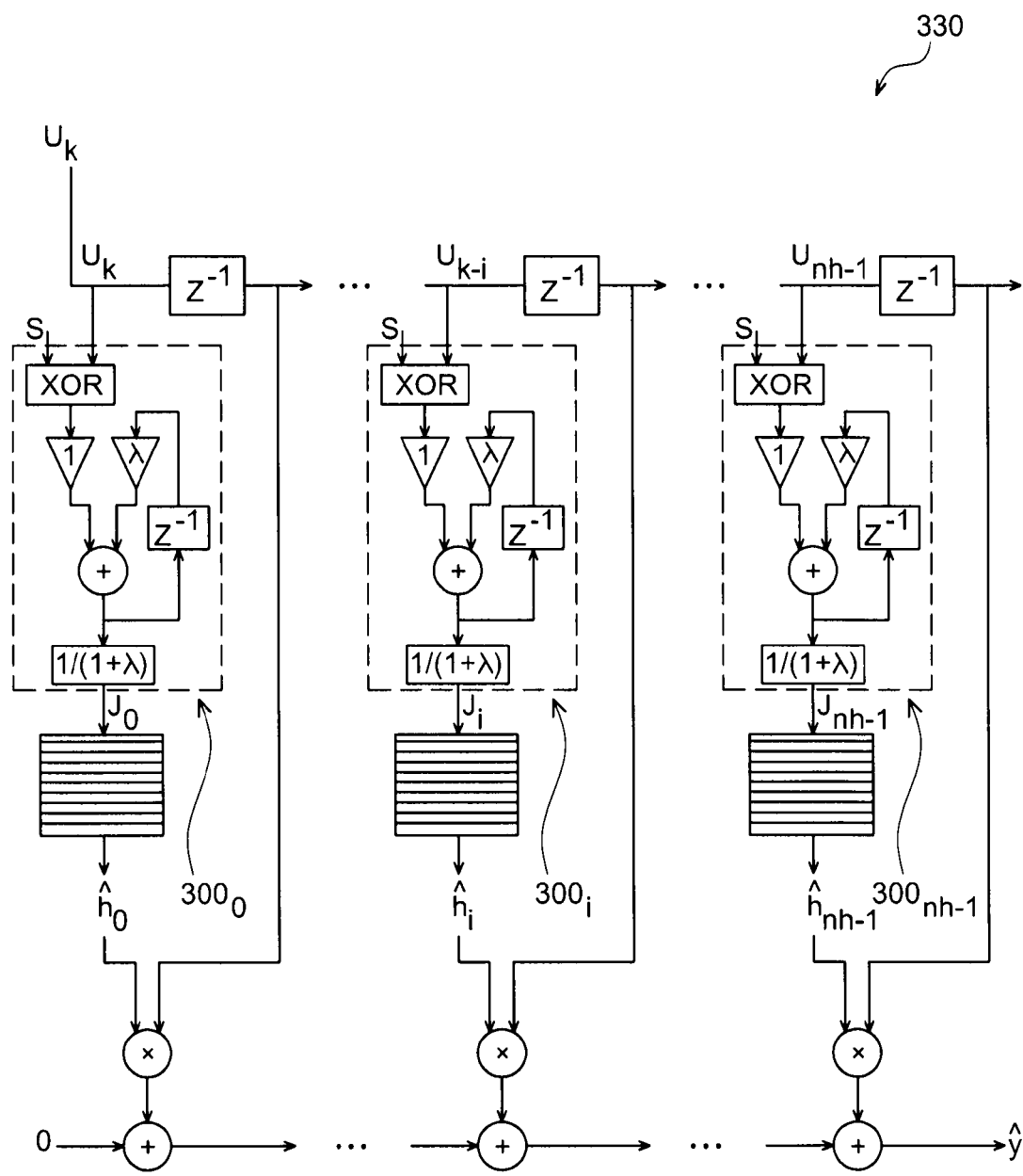
FIG. 15 illustrates another example of an impulse response estimation structure of a system, within a device according to the invention.

In FIG. 15, a structure variation 330 provided to deliver an estimation of ŷ is shown. This structure 330 differs from that previously described relative to FIG. 13, by the calculation of the cost function, and includes nh units $300_0$, ..., $300_i$, ..., $300_{nh-1}$ for evaluating cost function elements J' like that (referenced 300) just described relative to FIG. 14.

Figure 16:
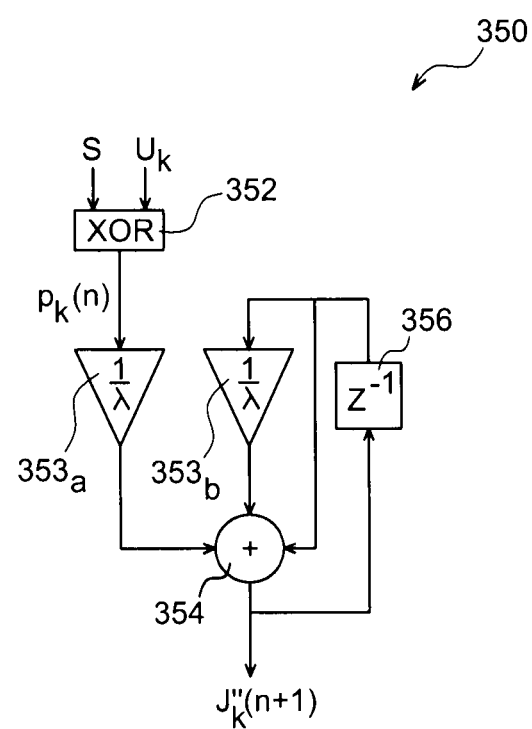
FIG. 16 provides another alternative of a cost function calculation unit integrated into a device according to the invention, and in particular a structure for estimating the output of a system to be identified with the aid of an estimation of the impulse response of that system.

In FIG. 16, another example of a calculation unit 350, making it possible to perform the calculation of an element J"$_k$ of another cost function variation J", is given.

This unit 350 comprises a means 352 forming an exclusive OR logic gate (XOR) at the input of which an output $s_k$ of the comparator 120 at a moment k is transmitted, and an input signal $u_{k-i}$ of the system 100.

The unit 350 also comprises a means 353a making it possible to apply a ratio (1/λ), at the output pk(n) of the XOR gate, as well as a means 354 forming a summer at the output of the means 353a, a means 356 forming a first order delay filter at the output of the summer 354 and the output of which is reinjected at the input of a means 353b making it possible to apply a ratio (1/λ), the output of the means 353b and the filter 356 being transmitted to the input of the summer 354. At the output of the summer 354, an element of said second cost function variation J" is obtained.

The sum (1+λ) of the coefficient λ and the unit corresponds to a number N of calculation points.

In this example, the coefficient λ is chosen equal to a power of 2: λ=2^b.

The means 353a and 353b are also capable of performing a shift of their binary input, each to apply the ratio 1/λ, which amounts to applying a shift of b bits to the right.

In relation to the structure 300 described relative to FIG. 15, this makes it possible to do away with multipliers.

This other variation of a calculation unit 350 is implemented with a coefficient λ chosen such that λ is large before 1 (1<<λ). "Large" λ means that λ is greater than at least $2^{10}$.

$$J'_k(n+1) = \frac{j_k(n) + \lambda J_k(n)}{1+\lambda} = \frac{j_k(n)}{1+\lambda} + \frac{\lambda J_k(n)}{1+\lambda}$$

$$J''_k(n+1) = \frac{j_k(n)}{1+\lambda} + \frac{\lambda J_k(n)}{1+\lambda}$$

$$J''_k(n+1) = \frac{1}{\lambda} j_k(n) + \frac{J_k(n)}{1+1/\lambda}$$

$$J''_k(n+1) = \frac{1}{\lambda} j_k(n) + \sum_m (-1)^m \left(\frac{1}{\lambda}\right)^m J_k(n)$$

Considering the limited second order development, we have the following relationship:

$$J''_k(n+1) = \frac{1}{\lambda} j_k(n) + J_k(n) - \frac{1}{\lambda} J_k(n)$$

When λ is chosen such that 1<<λ, we have J"(n)≈J(n), the cost function J being substantially equal to the cost function variation J".

Figure 17:
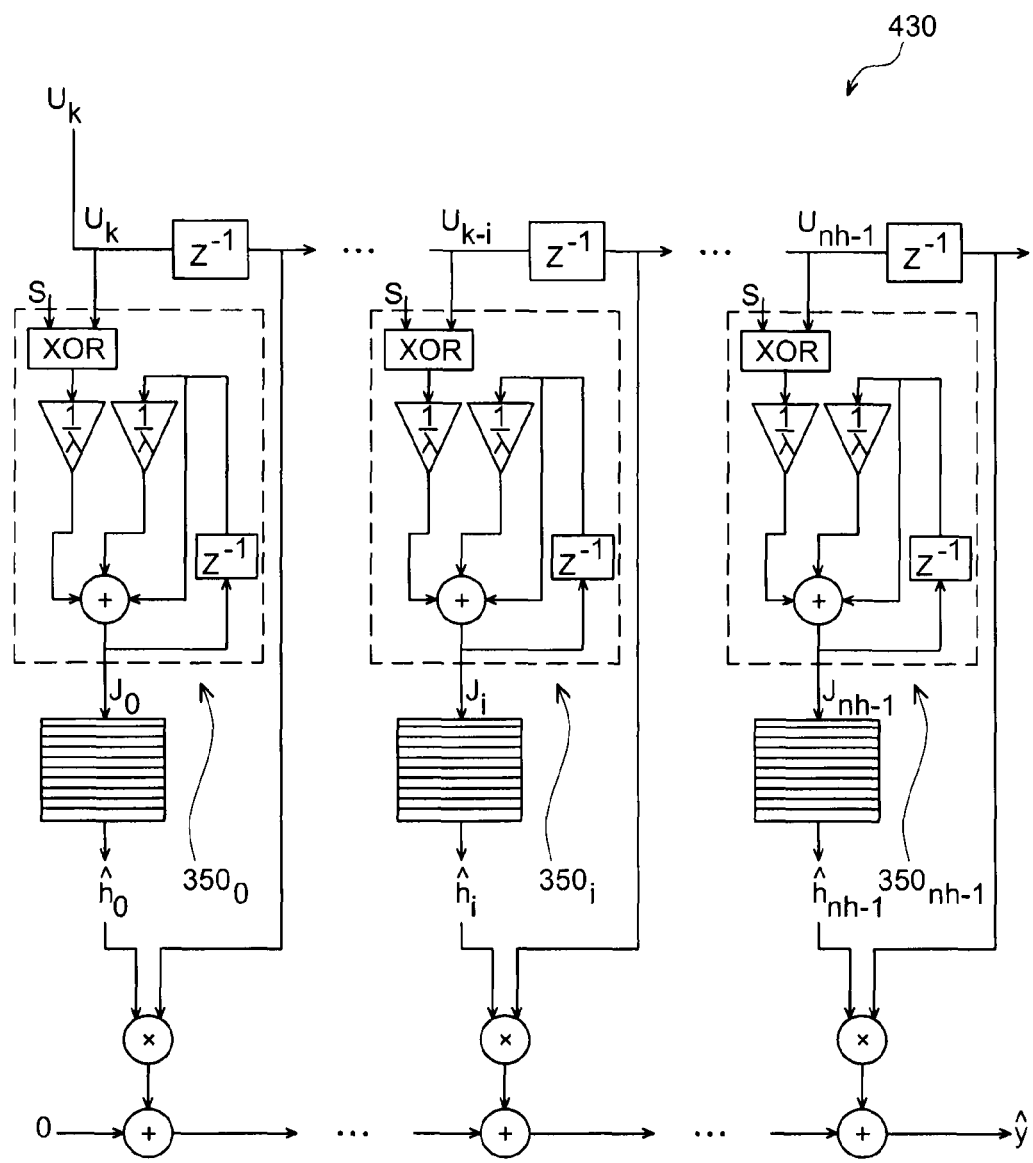
FIG. 17 illustrates another example of an impulse response estimation structure of a system within a device according to the invention.

In FIG. 17, a structure variation 430 provided to deliver an estimation of ŷ is shown. This structure 430 differs from that previously described relative to FIG. 14, by the calculation of the cost function, and includes nh units $350_0, \ldots, 350_i, \ldots, 350_{nh-1}$ for evaluating the cost function J" like that (referenced 350) just described relative to FIG. 16.

Figure 18:
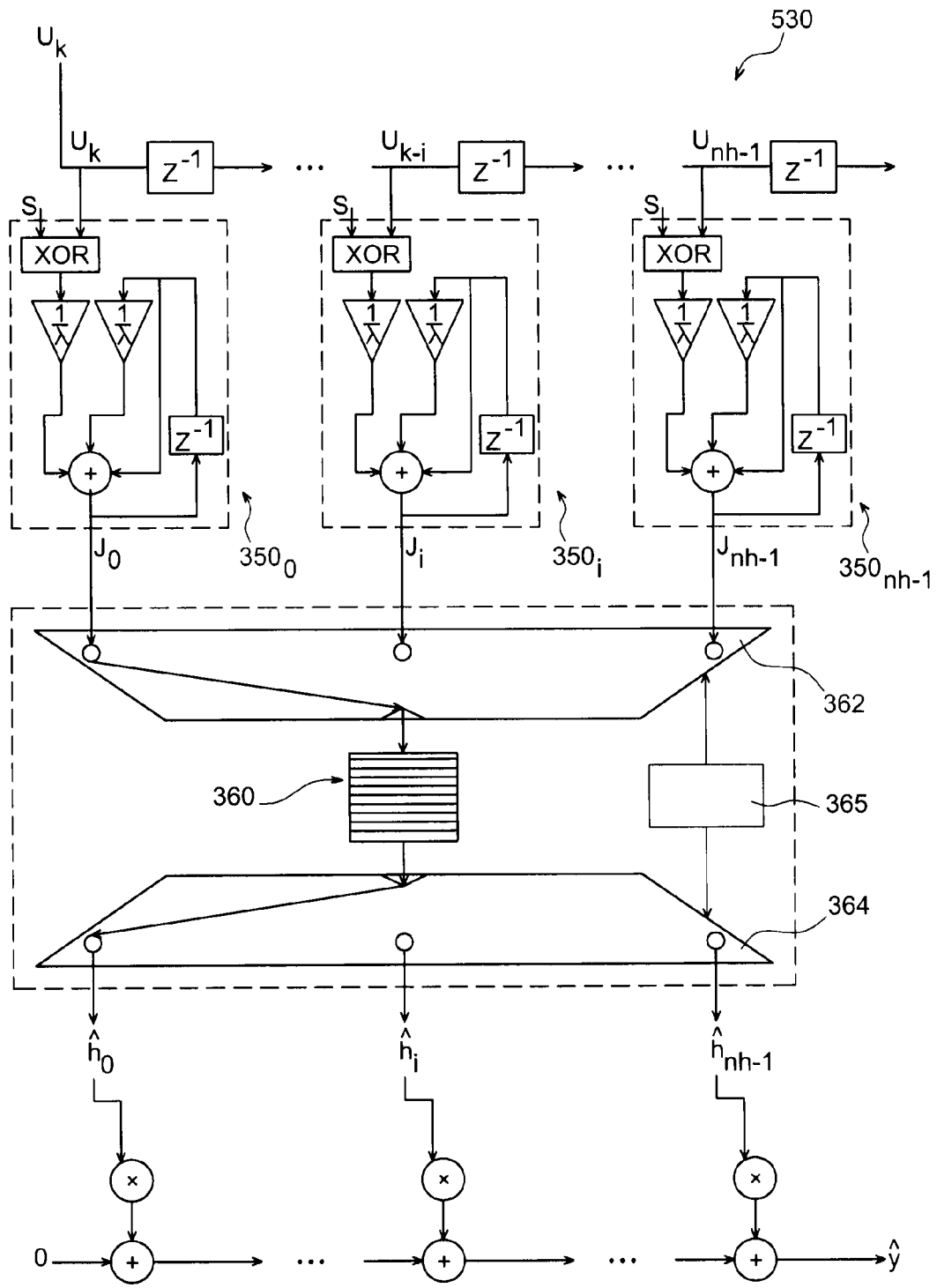
FIG. 18 illustrates another example of an impulse response estimation structure with one LUT of a system, within a device according to the invention.

Another example of a structure 530 provided to deliver an estimation ŷ of the output of the system 100 is given in FIG. 18. In this example, the means for applying a passage function f from a cost function element Ji to an impulse response element ĥi differs from that of the structures 230, 330 previously described relative to FIGS. 13 and 15. In this example, the number of LUTs is greatly reduced relative to that of the structures 230 and 330. We go from nh LUTs, i.e. one LUT per level, to a single LUT for the nh levels of the structure.

To that end, a first multiplexer means 362 is provided at the output of the nh units $350_0, \ldots, 350_i, 350_{nh-1}$ for calculating the cost function J" like that (referenced 350) described relative to FIG. 16.

As a function of a selection signal transmitted by a control module 365, the first multiplexor means 362 transmits, as output, an input selected from a plurality of its inputs.

As output of the first multiplexer means 362 is a means 360 for example in the form of a LUT, to apply the passage function f.

A demultiplexer means 364 is provided at the output of the LUT 360. The input of the second demultiplexer means 364 is transmitted towards one of its outputs selected by a selection signal delivered by the control module 365. The outputs of the demultiplexer means 364 deliver elements ĥ0, . . . ĥi, ĥnh−1, respectively, for estimating an impulse response.

The control module 365 is thus provided to transmit selection signals towards the multiplexer means 362, and towards the demultiplexer means 364, so as to ensure good routing of the estimated impulse response values.

The structure 430 also includes the nh units $270_0, 270_1, \ldots, 270_i, \ldots, 270_{nh-1}$ to perform the convolution operation leading to the estimation ŷ.

The operation of one or the other of the structures 230, 330, 430, 530 has been presented up to now with a given number of levels nh. This number nh corresponds to a number of elements of the impulse response that one is seeking to identify, and can be modified or adapted.

The number of elements nh of the impulse response identified can be chosen depending on the complexity of the system 100 and the sampling frequency fs. The number nh of elements to be identified is greater than the number of non-zero elements n0 of the impulse response of the observed system: such that nh>n0. This number nh depends on features of the system 100, such as damping, and the sampling frequency fs. The greater the oversampling, the more levels nh will be provided for a given damping. The choice of the number nh is made so as to respect Shannon's theorem. In the case, for example, where the system to be identified is an electrical oscillator, the sampling frequency fs can be provided such that fs>2*fc with fc being the cutting frequency of the oscillator.

The number nh of levels is preferably small before λ, coefficient of the cost function calculation units. For example, λ can be considered to be at least $2^8$ times larger than nh and λ can assume values between $2^{10}$ and $2^{20}$.

Figure 19:
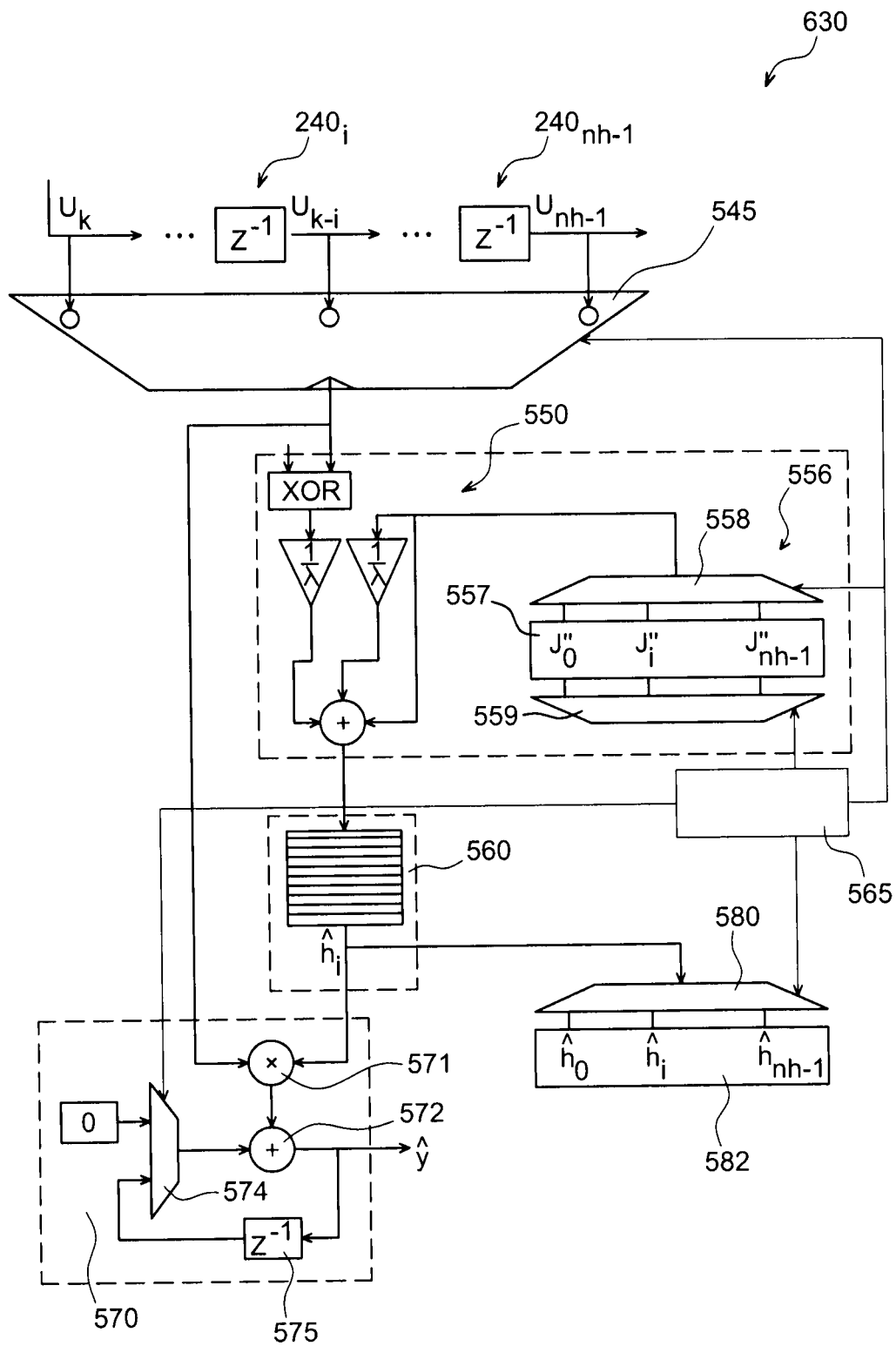
FIG. 19 illustrates another example of an estimation structure with one level, for estimating the impulse response of a system, within a device according to the invention.

Another example of a structure 630 provided to deliver an estimation ŷ is given in FIG. 19.

In this structure 630, a parallelization of the nh levels has been done, such that the structure 630 has one level.

To that end, at the output of the delay filters $240_1, \ldots, 240_{nh-1}$, a multiplexer means 545 is provided controlled by a control signal transmitted by a control module 565.

At the output of the multiplexing means 545, a unit 550 for calculating the elements of a cost function J" is provided. This level differs from that (referenced 350) previously described relative to FIG. 16 in that the means 356 forming a delay filter with z transfer function equal to $z^{-1}$, is replaced by a module 556 including a means forming a memory 557, a means forming a multiplexer 558 connected to the memory, and a means forming a demultiplexer 559 connected to the memory. The memory 557 is provided to store values of elements $J''_0, \ldots j''_i, \ldots, J''_{nh-1}$ of cost function J".

In order to calculate an element J"(n+1) of the cost function, an earlier cost function element or one previously calculated J"(n) is extracted from the memory 557 and transmitted as output from the multiplexer 558 in order to be injected at the input of a summer and a means for applying a ratio (1/λ).

The multiplexer 558 and the demultiplexer 559 are controlled by signals transmitted by the control module 565.

Once calculated, an element of the cost function is transmitted at the input of the demultiplexer means 559, to be placed in the memory 557.

As the output of the calculation level of J", a LUT 560 is placed provided to receive a cost function element J"I and produce, as output, a corresponding impulse response element ĥi.

This impulse response element ĥi may be transmitted towards a multiplexer 580 connected to a memory 582, then stored in said memory 582.

A convolution calculation module 570 is also provided at the output of the LUT 560. This module 570 comprises a means 571 forming a multiplier for multiplying the output of the LUT 560 delivering an impulse response estimation element ĥi, at the output of the multiplexer means 545 delivering an input signal u of the system among the signals $u_k, \ldots, u_{k-i}, \ldots, u_{nh-1}$. A means forming a summer 572 is provided to perform an addition of the output of the multiplier and a multiplexer 574. The output of the summer is reinjected at the input of the multiplexer 574 after having passed through a delay filter 575. The multiplexer 574 is also controlled by the control block 565.

At the output of the summer, an estimation ŷ is obtained.

The value of the coefficient λ can be modified, possibly during the identification method.

The choice of a low coefficient λ, for example less than $2^8$, makes it possible to give substantial weight to the new samples, and to obtain processing in which speed is favored over precision.

The choice of a high coefficient λ (with $b>2^{15}$) makes it possible to favor precision over speed.

The parameter λ can thus be made to evolve during the identification processing, depending on the progress of the impulse response estimation.

Figure 20:
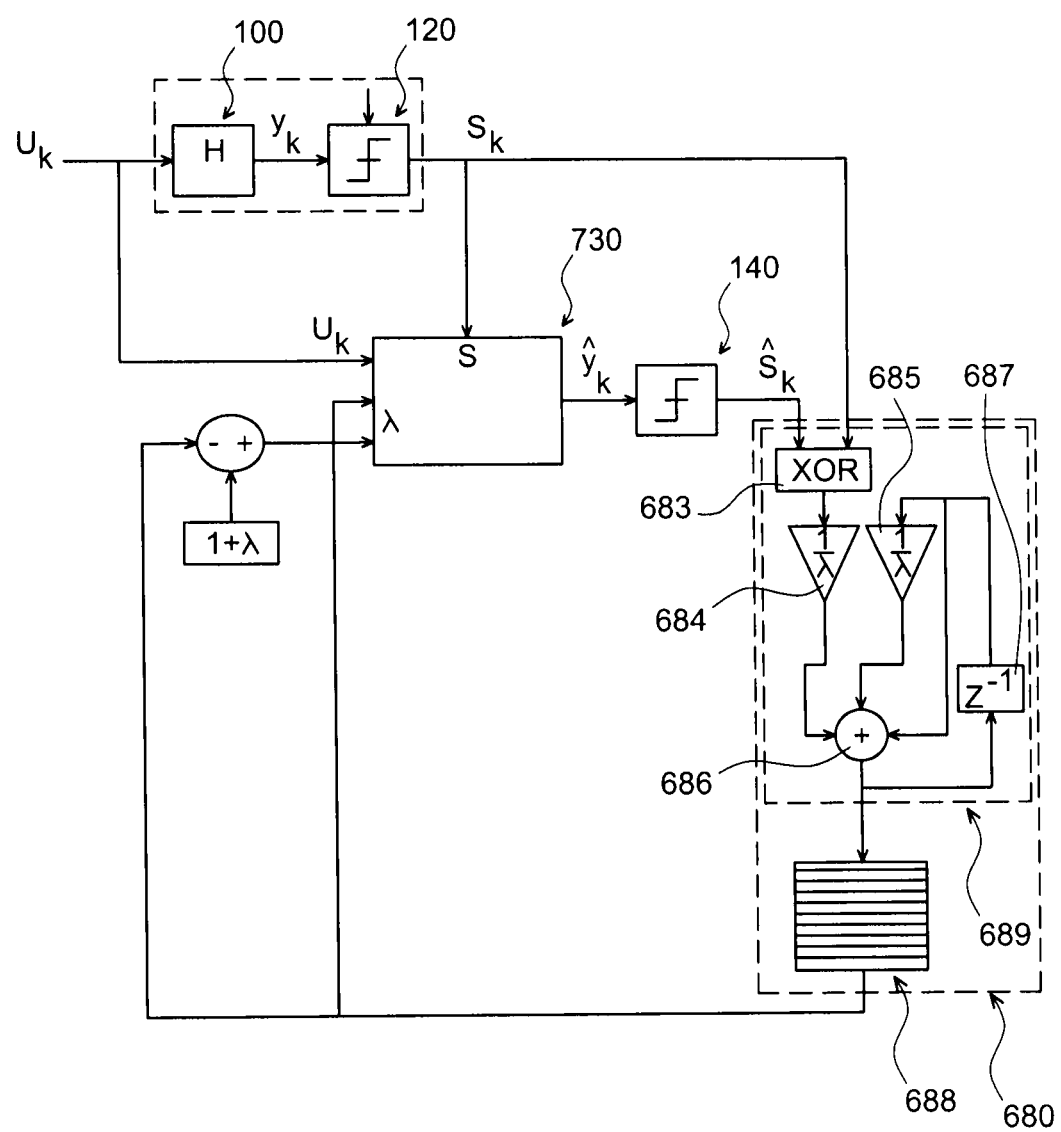
FIG. 20 illustrates an example of a device for implementing a method for identifying a system according to the invention, including a feedback loop to modify the precision or speed of the estimation of an impulse response during that estimation.

Another example of a device for implementing the identification method according to the invention is given in FIG. 20.

With such a device, during the processing done, the coefficient λ participating in the calculation of the cost function J is made to evolve.

Feedback or looping back is done at a structure 730 receiving the input signal u of the system and the output signal s of the comparator 120 and provided to deliver an estimation of ŷ. The structure 730 can be one of those 330, 430, 530, 630 previously described, with a control block 680 as output.

The control block 680 can comprise a calculation unit including components similar to those of the calculation unit described relative to FIG. 16. The block 680 receives, as input, the output signal s of the comparator 120 at a moment k, and the estimation ŝk coming out of the comparator 140.

The control block 680 can comprise a means 683 forming an exclusive OR logic gate (XOR) at the input of which the signals sk and ŝk are transmitted.

The level 689 also comprises a means 684 making it possible to apply a ratio (1/λ), for example with the aid of a shift register, at the output of the XOR gate, as well as a means 686 forming a summer at the output of the means 684, a means 687 forming a first order delay filter and with transfer function $z^{-1}$ at the output of the summer 686 and the output of which is reinjected at the input of a means 685 making it possible to apply a ratio (1/λ), for example with the aid of at least one shift register, the output of the means 685 and the filter 687 being transmitted at the input of the summer 686.

Thus, the calculation level 689 performs the calculation of a second criterion it to estimate the error on $\hat{s}_k$, relative to $s_k$, with it such that:

$$Jt(k) \approx \frac{1}{N} \sum_N XOR(s(k), \hat{s}(k))$$

(N: the number of calculation points equal to 1+λ)

The value of the coefficient λ is controlled, as a function of the obtained value of $J_t$. A function $f_t$ is then applied in order to determine a control law such as:

$$\lambda(k) = f_t(Jt(k))$$

In the case of FIG. 16, we have $\lambda = 2^{-b}$. The modification of λ amounts to a modification of b, we can therefore find a function ft such as:

$$b(k) = f_t(Jt(k))$$

The function $f_t$ can be applied via a LUT 688.

According to one alternative, the coefficient λ can be steered from the function $J_t$, while being free from the use of a LUT 680.

A linear relationship can be implemented between the parameter λ and $J_t$.

Figure 21:
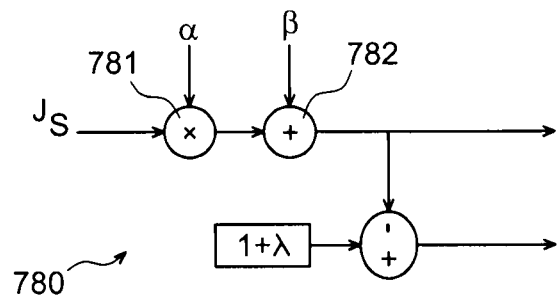
FIG. 21 illustrates an example of a means for modulating a calculation coefficient λ of a criterion J used to calculate an impulse response estimation in a method according to the invention.

FIG. 21 shows an example of a means 780 for applying a linear control, corresponding to the equation:

$$\lambda = \alpha * Jt + \beta \text{ where } \beta \neq 0 \text{ to avoid the case } \lambda = 0.$$

The LUT can then be replaced with this means 780, which includes a multiplier means 781 and a summer means 782.

Figure 22:
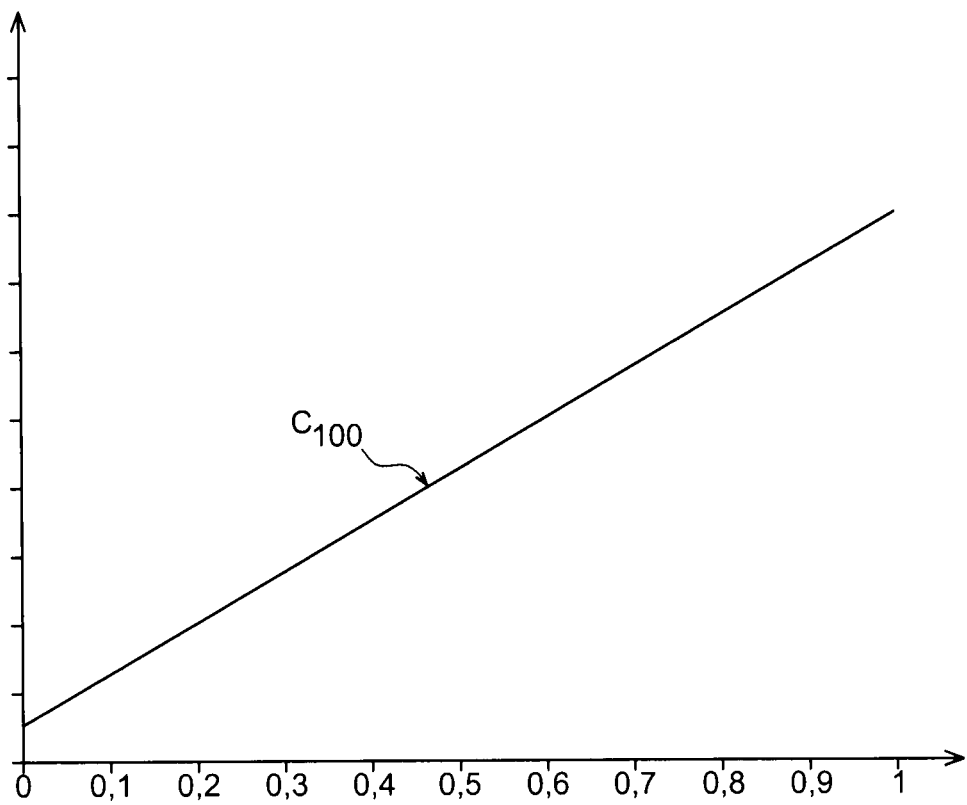
FIG. 22 illustrates an affine straight line of a relationship connecting a criterion Jt and a coefficient λ involved in the calculation of a cost function.

In FIG. 22, an example of a straight line $C_{100}$ representative of a linear control of the coefficient λ is given.

Figure 23:
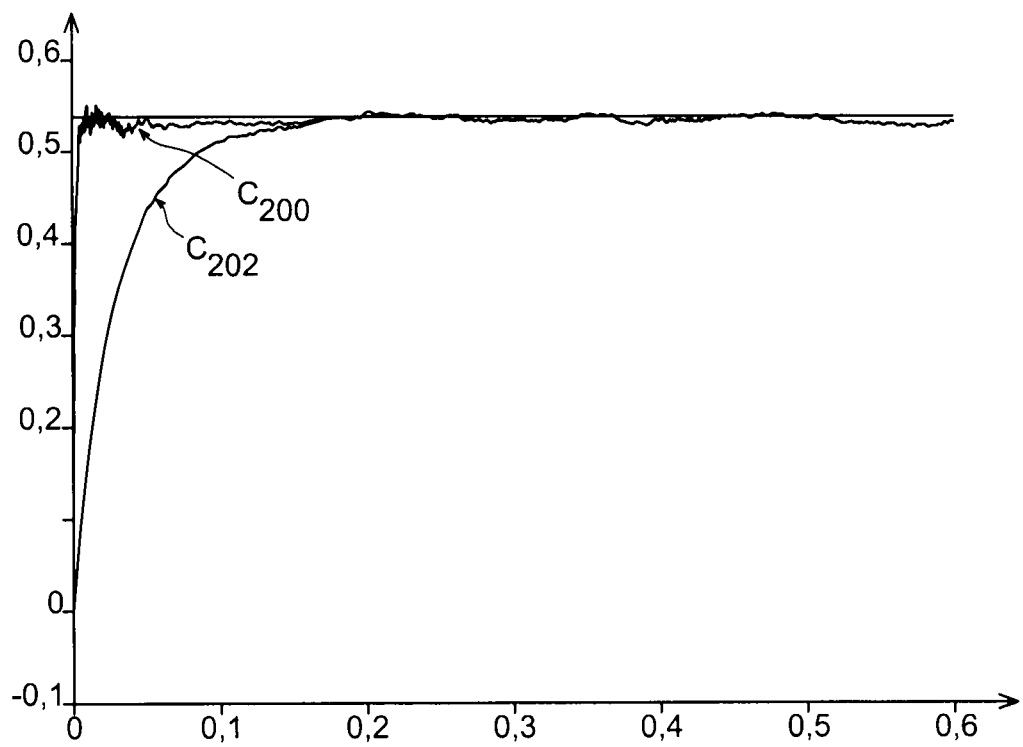
FIG. 23 provides examples of curves representative of an impulse response estimation, obtained using a first device according to the invention without a feedback loop, and using a second device according to the invention provided with a feedback loop, respectively.

FIG. 23 shows the contribution of the feedback and the control block 630. In this figure, a first curve $C_{200}$ is representative of the evolution of the estimation of the impulse response done without feedback. A second curve $C_{202}$ is representative of the evolution of the estimation of the impulse response done with a feedback loop provided with the control block 680.

Figure 24:
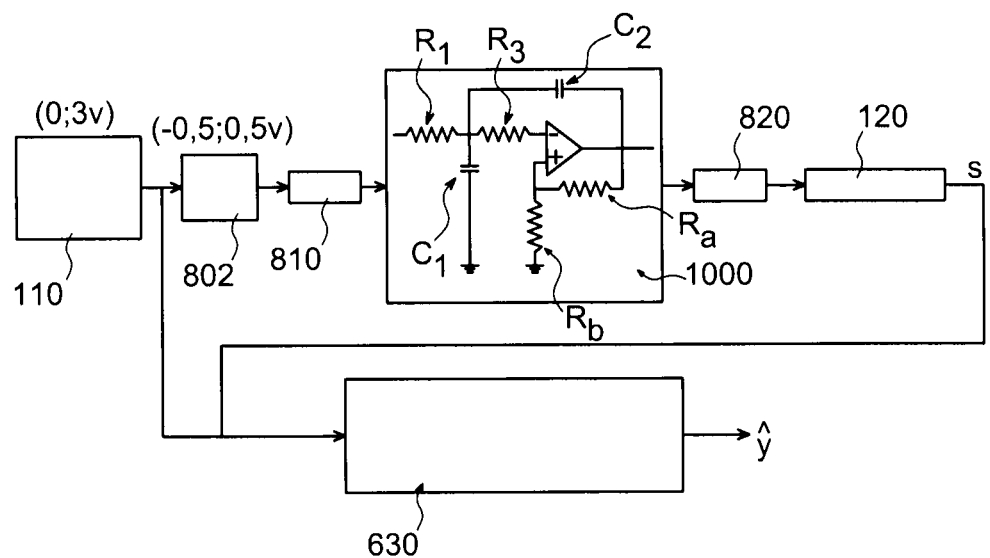
FIGS. 24 and 25 illustrate an example of an identification device according to the invention in which the system to be identified is a filter, and an example of an impulse response curve of said identification device, respectively.
Figure 25:
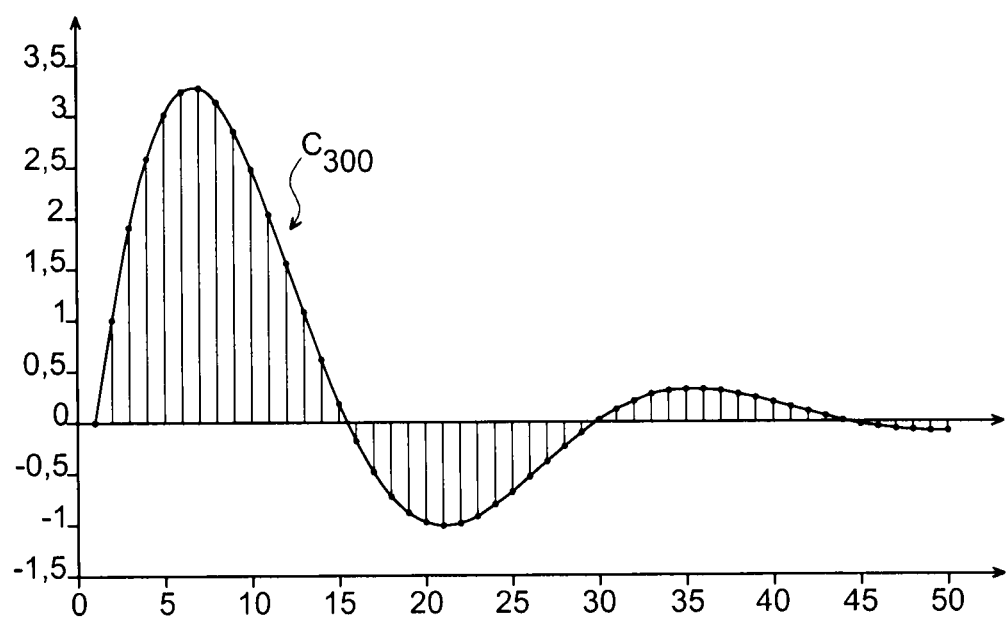
Figure 26:
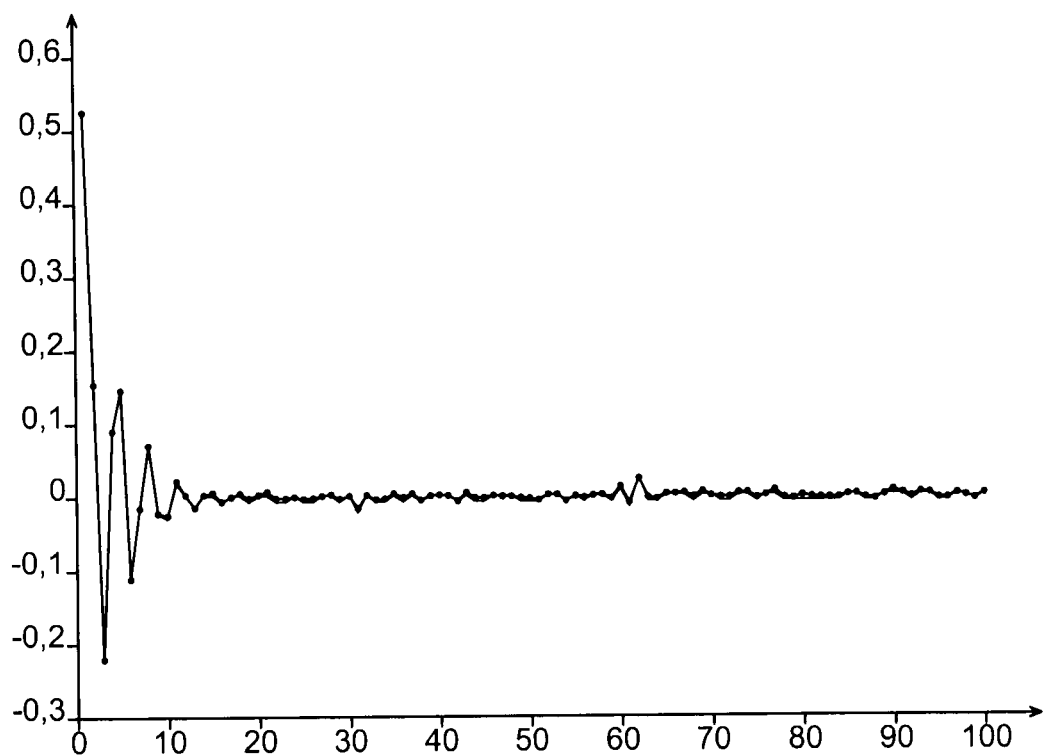
FIG. 26 provides examples of impulse response estimation curves determined using a simulation done using the matlab software and experimentation done using a program written in VHDL and carried out on a FPGA target.
Figure 27:
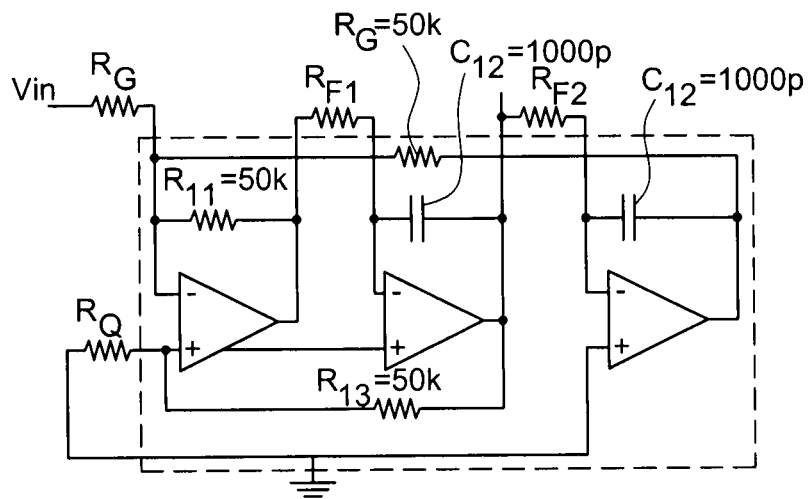
FIG. 27 illustrates an example of a system in the form of an active filter, on which an identification method according to the invention has been carried out.

Another example of a device according to the invention is given in FIG. 24.

This device comprises a noise generator 110, for example a pseudo-random signal generator of the 32nd order LFSR type, which can for example deliver a signal with an amplitude between 0 and 3 volts. At the output of the generator 110, a level shifter circuit 802 is provided and can deliver a signal for example between −0.5 volts and 0.5 volts. The device also comprises a first buffer circuit 810 at the input of a system 1000 to be identified, and a second buffer circuit 820 at the output of the system 1000. A comparator 120 is provided at the output of the second buffer circuit 820 and delivers the signal s to a means 830, for example one of the structures 130, 230, 330 previously described, to estimate the output of the system 1000. The means 830 also receives a noise signal u coming from the generator. The means 830 can for example be implemented with the aid of a FPGA.

In this example, the system 1000 can be a resonant second order RLC filter, whereof the transfer function H uses the following relationship:

$$H(p) = \frac{\frac{k}{R_1 R_3 C_1 C_2}}{p^2 + p\left[(1-k)\frac{1}{R_3 C_1} + \frac{1}{R_1 C_2} + \frac{1}{R_3 C_2}\right] + \frac{1}{R_1 R_3 C_1 C_2}}$$

$$k = 1 + \frac{R_a}{R_b}$$

with:

$$\varpi_0 = \frac{1}{\sqrt{R_1 R_3 C_1 C_2}}$$

$$\frac{1}{Q} = \sqrt{\frac{R_3 C_1}{R_1 C_2}} + \sqrt{\frac{R_1 C_1}{R_3 C_2}} + (1-k)\sqrt{\frac{R_1 C_2}{R_3 C_1}}$$

The resonance frequency of the filter can be in the vicinity of 1500 Hz, while the sampling frequency fs chosen is 5 kHz. Such a system 1000 can have an impulse response with the shape of curve $C_{300}$.

One example of a program implemented using the Matlab tool, to implement an impulse response estimation according to the invention, is provided in the annex. This program includes a function, having for inputs the input signal u and the output signal s, the number of levels nh, the coefficient value λ and the number of points nb_pts for parameter calculations. This function returns data hhat, corresponding to the estimation ĥ of the impulse response h of the observed system.

The implementation of the BIMBO_inline method can be done by a microcomputer including a calculation section with all of the electronic components, software or other, needed for the processing. Thus, for example, the microcomputer in particular includes at least one programmable processor, as well as at least one memory for this processing.

The processor can, for example, be a microprocessor, a DSP, or a central processing unit. The memory can for example be a hard drive, a read-only memory ROM, a CD-ROM, a dynamic random access memory DRAM, or any other type of memory RAM, a magnetic or optical storage element, registers or other volatile or non-volatile memory.

A program, making it possible to implement the method according to the invention, can be resident or recorded on a medium (e.g. floppy disk or CD ROM or DVD ROM or removable hard drive or magnetic medium) that can be read by a computer system or by the microcomputer.

According to one possibility, the BIMBO_inline algorithm and the noise generator can be implemented with the aid of a FPGA, the other elements, in particular the one-bit ADC, being able to take the form of discrete components.

The identification method can be used in the context of BIST (Built In Self Test) systems, i.e. systems with the ability to test themselves. This makes it possible to avoid the use of significant equipment during a test. In this case this involves applying the presented BIMBO_inline method to a system and comparing the desired and actual impulse responses to conclude on proper operation of the system.

The identification method can be used to perform autocalibration of a system, in particular an electromechanical system. During its operation. Such a system can be considered to evolve over time. The method according to the invention then makes it possible to estimate these evolutions, with the aid of estimations of the impulse response of the system, and to adapt the control system as a function thereof.

The estimation of the impulse response can be completed by a transfer function identification.

Figure 28:
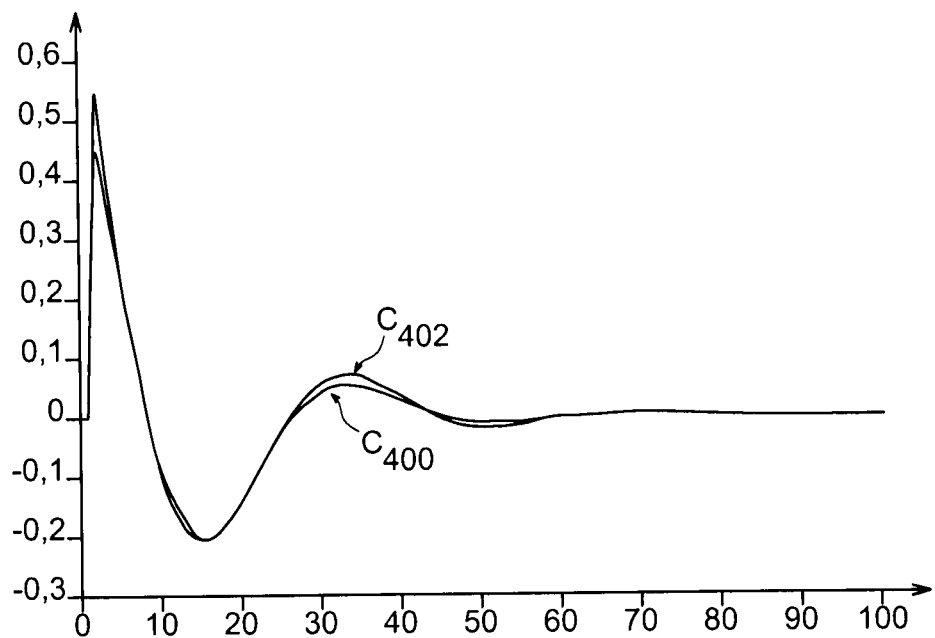
FIGS. 28 and 29 provide examples of impulse response estimation curves and gain of the filter of FIG. 27, obtained with the aid of an identification device according to the invention.

The method according to the invention has been tested on a universal active filter UAF42 by the company Texas Instrument and as shown in FIG. 28, with a sampling frequency for example in the vicinity of 15 kHz, and resistance values RF1=RF2=220 kΩ, RG=22 kΩ, RQ=10 kΩ. Such values correspond to a quality factor Q=1.2, and a natural frequency fo in the vicinity of 730 Hz.

Figure 29:
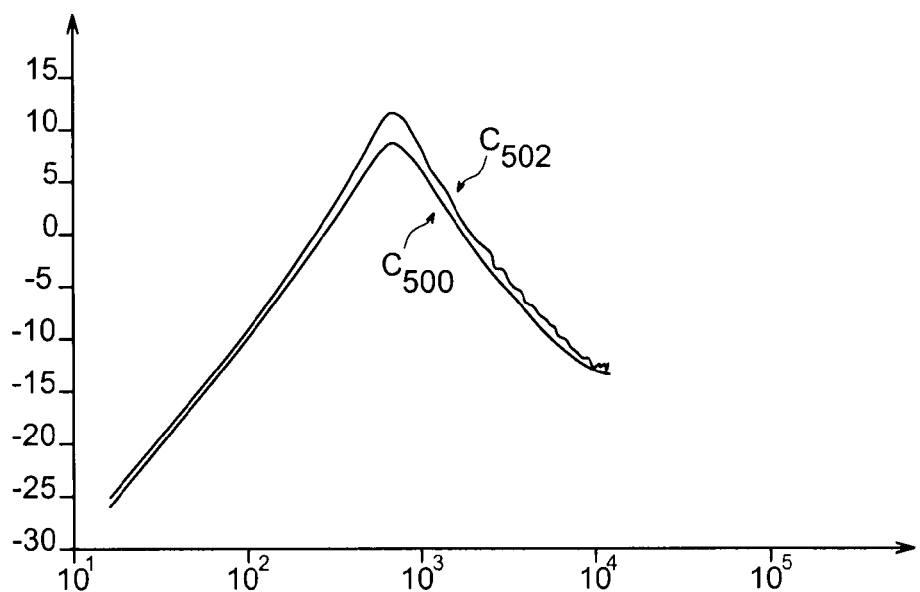

FIGS. 28 and 29 give amplitude C400 and gain C500 estimation curves of the filter obtained with 100 impulse response coefficients after 4000 samples at the output of a device, for example as described relative to FIG. 13, have been obtained.

By way of comparison, experimental amplitude $C_{402}$ and gain $C_{502}$ curves are provided.

Figure 30:
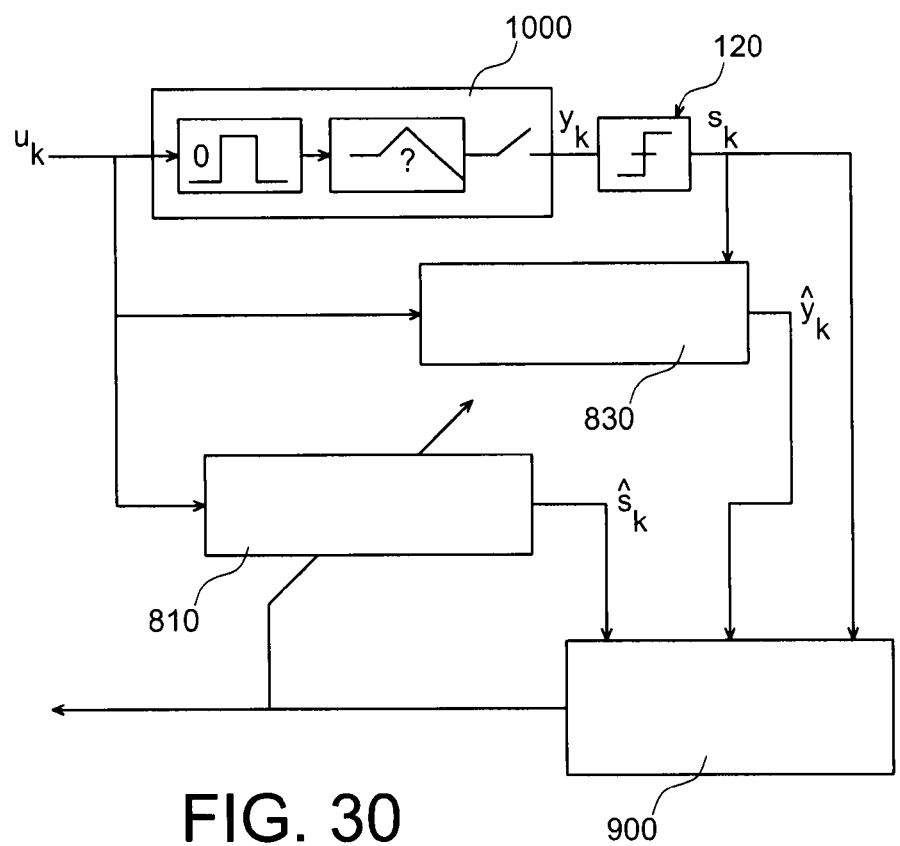
FIG. 30 provides an example of an architecture for carrying out an identification method according to the invention.

In FIG. 30, another example of a device according to the invention is provided. This device is provided with a means 830, for example one of the structures 130, 230, 330 previously described, for implementing the BIMBO_inline method and performing an estimation $\hat{y}_k$ of the output of a system 1000, which delivers a signal $s_k$. The means 830 also receives a noise signal u from the generator.

The presented BIMBO_inline algorithm receives the signals u and s from the noise generator and the comparator, respectively (analog digital converter), and provides an estimation $\hat{y}_k$ of the signal $y_k$ from the estimation of the impulse response. This estimation of the output of the observed system is used by a parametric adaptation algorithm.

The means 900 and 810 produce a parametric adaptation algorithm and use the output $y_k$ of the system. We therefore consider that $\hat{y}_k = y_k$.

The block 810 contains the approximate model of the observed system. This approximate model is an IIR type model (modeling in the form of a numerator/denominator transfer function with Infinite Impulse Response). This model is reevaluated at each sampling period by the block 900, which comprises the parametric adaptation algorithm therein, for example the algorithm of least squares. At each sampling period, the approximate model provides an estimation $\hat{\hat{y}}_k$ of $\hat{y}_k$. The parametric adaptation algorithm will provide a new estimation of the approximate model, including the output, by minimizing the error between $\hat{\hat{y}}_k$ and $\hat{y}_k$.

---

ANNEX

```
function [hhat] = verif_bimbo_inline(u,s,nh,nb_pts,a,b)
% initialization
u_delay_line=zeros(nh,1);
Csu=0.5*ones(nh,1);
% processing loop
for k=1:nb_pts
    u_delay_line=[u(k); u_delay_line(1:end-1)];
    J=a/b*xor(s(k),u_delay_line)+J-a/b*J;
    % estimation of h
    hhat=sqrt(2)*erfinv(-2*J+1)./sqrt(1+2*erfinv(-2*J+1).^2);
    % estimation of y ( reframing of u (0,1)=>(1,-1) )
    yhat= (-2*u_delay_line+1)*hhat;
end;
```

---

The invention claimed is:

1. A device for identifying an electronic or electromechanical system, comprising:

a noise generator for generating a noise signal ($u_k$), intended to generate the noise signal at the input of said system;

a one-bit analog digital converter, to which an output signal ($s_k$) of the system is intended to be applied;

an estimation device for carrying out an estimation ($\hat{h}$) of the impulse response of said system comprising:

first calculation means to perform an iterative calculation of a plurality of nh (with nh being an integer) elements ($J_0, \ldots, J_i, \ldots, J_{nh-1}$) of a given criterion J, each element including at least one correlation term between said signal output from said converter and said noise signal;

means for making an estimation ($\hat{h}_k$) of the output of said system with the aid of said estimation of the impulse response of said system, said means comprising a second calculation means to apply, to the calculated elements ($J_0, \ldots, J_i, \ldots, J_{nh-1}$) of said given criterion J, a passage function f predetermined as a function of the noise signal ($u_k$) transmitted at the input of said system, and such that:

$$f(J) = \sum_{i=0}^{nh-1} h_i \hat{h}_i$$

with $h_i$ an impulse response element h of said system and $\hat{h}_i$ an element of said impulse response estimation $\hat{h}$ of said system, wherein the passage function f is a function chosen so that each element Ji of the given criterion J and each element of said impulse response estimation of said system satisfy the relationship $\hat{h}_i = (f(J_i))$, with $$J_i = \frac{1}{2} - \frac{1}{2N} \sum_N s(k)u(k-i) \text{ or } J_i = \frac{1}{N} \sum_N XOR(s_k, u_{k-i}),$$

N being a number of samples, k being a moment, s being the output signal, and u being the noise signal.

2. The device according to claim 1, wherein said input signal ($u_k$) of the system is a binary white noise signal, said passage function f following the relationship:

$$f(J) = \sigma\sqrt{2} \frac{\text{erf}^{-1}(1-2J)}{\sqrt{1+2(\text{erf}^{-1}(1-2J))^2}}.$$

3. The device according to claim 1, wherein the estimation device comprises: a chain of blocks respectively forming a first order delay function or having $z^{-1}$ as z transfer function, said chain being intended to receive said input signal ($u_k$), and to transmit values ($u_k, \ldots u_{k-i}, u_{k-nh-1}$) of the delayed noise signal at the output of said blocks, respectively.

4. The device according to claim 1, wherein said first calculation means comprises:
means forming an exclusive OR logic gate, to perform an exclusive OR logic operation between said output signal ($s_k$) of said converter taken at a moment k and said noise signal ($u_{k-i}$, with $0 \leq i \leq nh$) delayed by i relative to said given moment,
adding means, to add the result of said logic operation to a term depending on an element of said given criterion calculated previously.

5. The device according to claim 1, wherein the acquisition of said output signal ($S_k$) at the output of said converter is done for a given number (N) of samples, the calculation of the given criterion J by the first calculation means being dependent on at least one predetermined coefficient λ, λ being equal to said given number (N) of samples.

6. The device according to claim 5, further comprising means for modifying the coefficient value λ during said estimation ($\hat{h}$) of said impulse response.

7. The device according to claim 5, the first calculating means comprising means making it possible to apply said coefficient λ in the form of at least one shift register and/or means for applying a ratio 1/(1+λ) in the form of at least one shift register.

8. The device according to claim 7, the first calculating means comprising means making it possible to apply a ratio (1/λ) in the form of at least one shift register.

9. The device according to claim 6, wherein said modification of the coefficient λ can be done as a function of the evaluation of a second criterion Jt, the device further comprising:
means for evaluating said second criterion Jt including at least one exclusive OR logic gate (XOR) to perform an exclusive OR logic operation (XOR) between said output signal ($S_k$) from said converter and an estimation ($\hat{S}_k$) of that signal,
adding means, for adding the result of said logic operation between said output signal ($s_k$) from said converter and an estimation ($\hat{S}_k$) of that signal, to a term depending on an element of said second criterion previously calculated.

10. The device according to claim 9, the modification of the coefficient λ being done as a function of the evaluation of said second criterion Jt, according to the following relationship:

λ=α*Jt+β (with α>0 and β>0).

11. The device according to claim 1, said means for performing said estimation ($\hat{h}_k$) comprising a means for convolution calculation between the estimated impulse response ($\hat{h}$) and the noise input signal ($u_k$).

12. The device according to claim 1, said system being an electronic filter or a MEMS.

13. A method of identifying an electronic or electromechanical system comprising:
applying at least one noise signal ($u_k$) as input to the system;
applying an output signal ($s_k$) of said system to a one-bit analogue digital converter;
carrying out an estimation of the output of said system with the aid of means for performing an estimation ($\hat{h}$) of the impulse response of said system, the estimation ($\hat{h}$) of said impulse response comprising:
the iterative calculation of a plurality of nh (nh being an integer) elements ($J_0, \ldots, J_i, \ldots, J_{nh-1}$) of a given criterion J, each element including at least one term of correlation between said signal at the output of said converter and said noise signal,
estimating the output of said system with the aid of said estimation of the impulse response of said system, said estimating comprising the application to said calculated elements (Ji) of the given criterion (J) of a passage function (f), said passage function (f) being predetermined as a function of said signal applied at the input of said system, and such that:

$$f(J) = \sum_{i=0}^{nh-1} h_i \hat{h}_i$$

with $h_i$, an impulse response element h of said system and $\hat{h}_i$ an element of said impulse response estimation $\hat{h}$ of said system among a plurality of nh impulse response elements ($\hat{h}_0, \ldots, \hat{h}_i, \ldots, \hat{h}_{nh-1}$), wherein the passage function f is a function chosen so that each element Ji of the given criterion J and each element of said impulse response estimation of said system satisfy the relationship $\hat{h}_i = (f(J_i))$, with $$J_i = \frac{1}{2} - \frac{1}{2N}\sum_N s(k)u(k-i) \text{ or } J_i = \frac{1}{N}\sum_N XOR(s_k, u_{k-i}),$$

N being a number of samples, k being a moment, s being the output signal, and u being the noise signal.

14. The method according to claim 13, wherein said input signal ($u_k$) of the system is a binary white noise signal, said passage function f following the relationship:

$$f(J) = \sigma\sqrt{2} \frac{\text{erf}^{-1}(1-2J)}{\sqrt{1+2(\text{erf}^{-1}(1-2J))^2}}.$$

15. A device for identifying an electronic or electromechanical system, comprising:
a noise generator for generating a noise signal ($u_k$), intended to generate a noise signal at the input of said system;
a one-bit analog digital converter, to which an output signal ($s_k$) of the system is intended to be applied;

an estimation device for carrying out an estimation ($\hat{h}$) of the impulse response of said system comprising:

first calculation means to perform an iterative calculation of a plurality of nh (with nh being an integer) elements ($J_0, \ldots, J_i, \ldots, J_{nh-1}$) of a given criterion J, each element including at least one correlation term between said signal output from said converter and said noise signal;

means for making an estimation ($\hat{h}_k$) of the output of said system with the aid of said estimation of the impulse response of said system, said means comprising a second calculation means to apply, to the calculated elements ($J_0, \ldots, J_i, \ldots, J_{nh-1}$) of said given criterion J, a passage function f predetermined as a function of the noise signal ($u_k$) transmitted at the input of said system, and such that:

$$f(J) = \sum_{i=0}^{nh-1} h_i \hat{h}_i$$

with $h_i$ an impulse response element h of said system and $\hat{h}_i$ an element of said impulse response estimation $\hat{h}$ of said system, wherein said input signal ($u_k$) of the system is a binary white noise signal, said passage function f following the relationship:

$$f(J) = \sigma\sqrt{2}\,\frac{\operatorname{erf}^{-1}(1-2J)}{\sqrt{1+2(\operatorname{erf}^{-1}(1-2J))^2}}.$$

16. A device for identifying an electronic or electromechanical system, comprising:

a noise generator for generating a noise signal ($u_k$), intended to generate a noise signal at the input of said system;

a one-bit analog digital converter, to which an output signal ($s_k$) of the system is intended to be applied;

an estimation device for carrying out an estimation ($\hat{h}$) of the impulse response of said system comprising:

first calculation means to perform an iterative calculation of a plurality of nh (with nh being an integer) elements ($J_0, \ldots, J_i, \ldots, J_{nh-1}$) of a given criterion J, each element including at least one correlation term between said signal output from said converter and said noise signal;

means for making an estimation ($\hat{h}_k$) of the output of said system with the aid of said estimation of the impulse response of said system, said means comprising a second calculation means to apply, to the calculated elements ($J_0, \ldots, J_i, \ldots, J_{nh-1}$) of said given criterion J, a passage function f predetermined as a function of the noise signal ($u_k$) transmitted at the input of said system, and such that:

$$f(J) = \sum_{i=0}^{nh-1} h_i \hat{h}_i$$

with $h_i$ an impulse response element h of said system and $\hat{h}_i$ an element of said impulse response estimation $\hat{h}$ of said system, wherein said first calculation means comprises:

means forming an exclusive OR logic gate, to perform an exclusive OR logic operation between said output signal ($s_k$) of said converter taken at a moment k and said noise signal ($u_{k-i}$, with 0≤i≤nh) delayed by i relative to said given moment, adding means, to add the result of said logic operation to a term depending on an element of said given criterion calculated previously.

* * * * *